US012567365B2

(12) United States Patent
Xiao et al.

(10) Patent No.: US 12,567,365 B2
(45) Date of Patent: Mar. 3, 2026

(54) DISPLAY APPARATUS, AND ADJUSTMENT METHOD AND FORMATION METHOD THEREOF USING BRIGHTNESS CHANGE RATE TO DETERMINE A POWER VOLTAGE

(71) Applicant: Hubei Yangtze Industrial Innovation Center of Advanced Display Co., LTD., Wuhan (CN)

(72) Inventors: Xun Xiao, Wuhan (CN); Shuo Tang, Wuhan (CN); Xigang Liu, Wuhan (CN); Chuan Liu, Wuhan (CN); Junbo Xu, Wuhan (CN)

(73) Assignee: Hubei Yangtze Industrial Innovation Center of Advanced Display Co., LTD., Wuhan (CN)

( * ) Notice: Subject to any disclaimer, the term of this patent is extended or adjusted under 35 U.S.C. 154(b) by 250 days.

(21) Appl. No.: 18/229,954

(22) Filed: Aug. 3, 2023

(65) Prior Publication Data

US 2024/0355277 A1 Oct. 24, 2024

(30) Foreign Application Priority Data

Apr. 21, 2023 (CN) ......................... 202310440136.3

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2320/0233* (2013.01);
(Continued)

(58) Field of Classification Search
CPC ................. G09G 3/006; G09G 3/2007; G09G 3/30–3291; G09G 2320/0233;
(Continued)

(56) References Cited

U.S. PATENT DOCUMENTS 11,322,075 B2 * 5/2022 Pyo .......................... G09G 5/10
2006/0044227 A1 * 3/2006 Hadcock .............. G09G 3/3225 345/76

(Continued)

FOREIGN PATENT DOCUMENTS

CN 109064966 A 12/2018
CN 115798404 A 3/2023

*Primary Examiner* — Keith L Crawley
(74) *Attorney, Agent, or Firm* — Anova Law Group, PLLC

(57) ABSTRACT

A display apparatus, an adjustment method and a formation method are provided in the present disclosure. The adjustment method includes recording a voltage value inputted to the first power signal line as a value A, where the value A is an actual voltage value of the first power signal line when the display panel is at the first target brightness level and the
(Continued)

drive transistor operates in a saturation region; inputting the value A to the first power signal line in the display panel, reading a first actual data voltage value on a data line in the display panel at this point, and re-finding a first actual grayscale value corresponding to the first actual data voltage value from the gamma curve; and programming the value A, the first actual data voltage value and the first actual grayscale value corresponding to the value A into the drive chip.

20 Claims, 14 Drawing Sheets

(52) U.S. Cl.
CPC ............... *G09G 2320/0276* (2013.01); *G09G 2320/0285* (2013.01); *G09G 2320/0673* (2013.01); *G09G 2330/021* (2013.01)

(58) Field of Classification Search
CPC .... G09G 2320/0271–0276; G09G 2320/0285; G09G 2320/0673; G09G 2320/0693; G09G 2330/02–021; G09G 2330/026; G09G 2330/028; G09G 2360/141; G09G 2360/145; G09G 2360/16
See application file for complete search history.

(56) References Cited

U.S. PATENT DOCUMENTS

| | | | | |
|---|---|---|---|---|
| 2008/0246749 | A1* | 10/2008 | Lee | G09G 3/3233 345/207 |
| 2009/0201281 | A1* | 8/2009 | Routley | G09G 3/3233 345/82 |
| 2011/0050669 | A1* | 3/2011 | Ahn | G09G 3/3258 345/211 |
| 2011/0221784 | A1* | 9/2011 | Lee | G09G 3/3233 345/690 |
| 2011/0316838 | A1* | 12/2011 | Ahn | G09G 3/3225 345/211 |
| 2013/0135272 | A1* | 5/2013 | Park | G09G 3/3233 345/211 |
| 2016/0171929 | A1* | 6/2016 | Lee | G09G 3/3233 345/77 |
| 2019/0114965 | A1 | 4/2019 | Lim | |
| 2019/0130827 | A1* | 5/2019 | Pyo | G09G 3/3233 |
| 2019/0311682 | A1* | 10/2019 | Pyo | G09G 3/3233 |
| 2019/0325821 | A1* | 10/2019 | Pyo | G09G 3/3208 |
| 2019/0340981 | A1* | 11/2019 | Pyo | G09G 3/3291 |
| 2020/0135097 | A1* | 4/2020 | Liu | G09G 3/2007 |
| 2020/0302866 | A1* | 9/2020 | Kim | G09G 3/3225 |

* cited by examiner

DISPLAY APPARATUS, AND ADJUSTMENT METHOD AND FORMATION METHOD THEREOF USING BRIGHTNESS CHANGE RATE TO DETERMINE A POWER VOLTAGE

CROSS-REFERENCE TO RELATED APPLICATION

The present disclosure claims the priority of Chinese Patent Application No. 202310440136.3, filed on Apr. 21, 2023, the content of which is incorporated herein by reference in its entirety.

TECHNICAL FIELD

The present disclosure generally relates to the field of display technology and, more particularly, relates to a display apparatus, and an adjustment method and a formation method of the display apparatus.

BACKGROUND

Organic light-emitting diodes (OLED) have the characteristics of self-illumination, fast response, wide color gamut, large viewing angle, high brightness and the like, and can form thin display apparatuses and flexible display apparatuses, thereby gradually becoming the research focus in the field of display technology. Organic light-emitting diodes need to be driven by current. When the organic light-emitting diode is applied in the display field, a drive current is provided to the organic light-emitting diode by controlling a drive transistor in a pixel circuit, such that the organic light-emitting diode emits light. Moreover, a stable drive current may need to be provided to the organic light-emitting diode to ensure display application performance.

In the field of electronic products, users always pay attention to power consumption performance. Although OLED display apparatuses have excellent advantages, OLED display apparatuses also have certain disadvantages. For example, the power consumption of OLED display apparatuses is high. With gradual development of OLED display apparatuses to high PPI (pixels per inch, that is, the number of pixels per inch; and the higher the PPI value is, the higher density is used to display images), how to reduce power consumption becomes more critical.

Therefore, there is a need to provide OLED display apparatuses which are capable of saving power consumption and ensuring display effect.

SUMMARY

One aspect of the present disclosure provides an adjustment method of a display apparatus, where the display apparatus includes a display panel and a drive chip; and the display panel at least includes a plurality of drive transistors and a plurality of first power signal lines. The adjustment method includes obtaining a gamma curve of the display panel corresponding to different grayscale values; powering on the display panel, and inputting a first fixed voltage value to a first power signal line, such that the display panel emits light; and in the gamma curve, finding a first theoretical gamma value corresponding to a 255-th grayscale brightness of the display panel at a first target brightness level, and writing the first theoretical gamma value into the display panel; inputting an initial voltage value to the first power signal line; and detecting a brightness change of the display panel using voltage values digressively inputted, based on the initial voltage value and with ΔV as an amplitude, to the first power signal line, where the initial voltage value is a theoretical voltage value corresponding to the first power signal line when a drive transistor in the display panel operates in a non-saturation region; when a brightness change rate of the display panel is less than 5%, recording the voltage value inputted to the first power signal line at this point as a value A, where the value A is an actual voltage value of the first power signal line when the display panel is at the first target brightness level and the drive transistor operates in a saturation region; inputting the value A to the first power signal line in the display panel, reading a first actual data voltage value on a data line in the display panel at this point, and re-finding a first actual grayscale value corresponding to the first actual data voltage value from the gamma curve; and programming the value A, the first actual data voltage value and the first actual grayscale value corresponding to the value A into the drive chip.

Another aspect of the present disclosure provides a formation method of a display apparatus. The formation method includes completing an adjustment method of the display apparatus, where the display apparatus includes a display panel and a drive chip; and the display panel at least includes a plurality of drive transistors and a plurality of first power signal lines. The adjustment method includes obtaining a gamma curve of the display panel corresponding to different grayscale values; powering on the display panel, and inputting a first fixed voltage value to a first power signal line, such that the display panel emits light; and in the gamma curve, finding a first theoretical gamma value corresponding to a 255-th grayscale brightness of the display panel at a first target brightness level, and writing the first theoretical gamma value into the display panel; inputting an initial voltage value to the first power signal line; and detecting a brightness change of the display panel using voltage values digressively inputted, based on the initial voltage value and with ΔV as an amplitude, to the first power signal line, where the initial voltage value is a theoretical voltage value corresponding to the first power signal line when a drive transistor in the display panel operates in a non-saturation region; when a brightness change rate of the display panel is less than 5%, recording the voltage value inputted to the first power signal line at this point as a value A, where the value A is an actual voltage value of the first power signal line when the display panel is at the first target brightness level and the drive transistor operates in a saturation region; inputting the value A to the first power signal line in the display panel, reading a first actual data voltage value on a data line in the display panel at this point, and re-finding a first actual grayscale value corresponding to the first actual data voltage value from the gamma curve; and programming the value A, the first actual data voltage value and the first actual grayscale value corresponding to the value A into the drive chip.

Another aspect of the present disclosure provides a display apparatus. The display apparatus includes above display apparatus according to above-mentioned formation method.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

Figure 1:
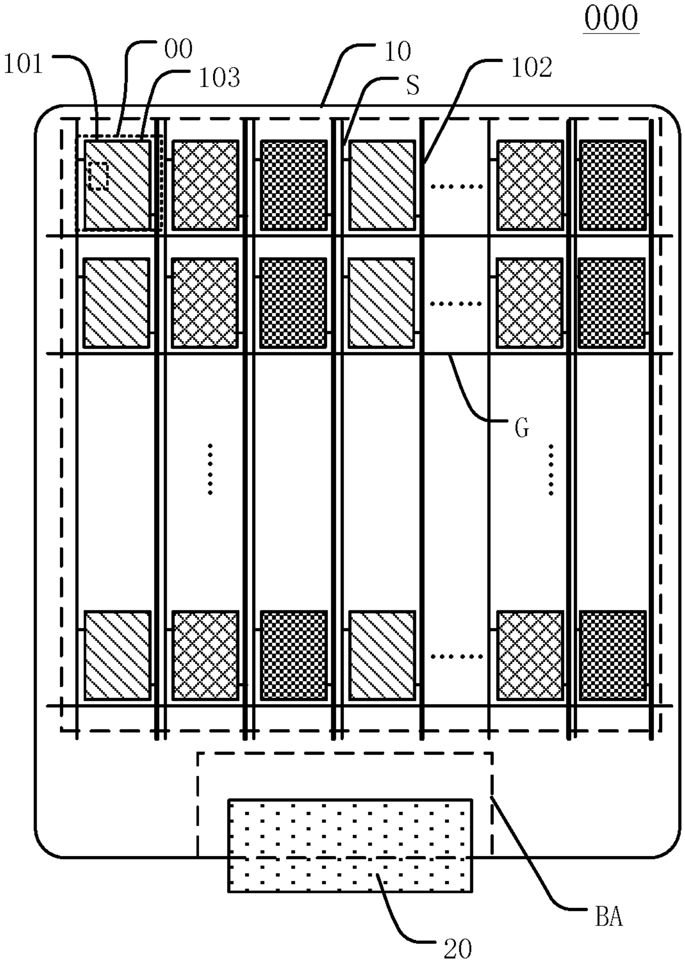
FIG. 1 illustrates a planar structural schematic of a display apparatus using an adjustment method according to various embodiments of the present disclosure.

Various exemplary embodiments of the present disclosure are described in detail with reference to accompanying drawings. It should be noted that unless specifically stated otherwise, relative arrangement of assemblies and steps, numerical expressions and values described in those embodiments may not limit the scope of the present disclosure.

Following description of at least one exemplary embodiment may be merely illustrative and may not be configured to limit the present disclosure and its application or use.

The technologies, methods and apparatuses known to those skilled in the art may not be discussed in detail, but where appropriate, the technologies, methods and apparatuses should be considered as a part of the present disclosure.

In all examples shown and discussed herein, any specific value should be interpreted as merely exemplary, rather than as a limitation. Therefore, other examples in exemplary embodiment may have different values.

It is apparent to those skilled in the art that various modifications and variations may be made in the present disclosure without departing from the spirit or scope of the present disclosure. Therefore, the present disclosure is intended to cover modifications and variations of the present disclosure falling within the scope of corresponding claims (technical solutions to be protected) and their equivalents. It should be noted that, implementation manners provided in embodiment of the present disclosure may be combined with each other if there is no contradiction.

It should be noted that similar reference numerals and letters are configured to indicate similar items in following drawings. Therefore, once an item is defined in one drawing, it does not need to be further discussed in subsequent drawings.

Figure 2:
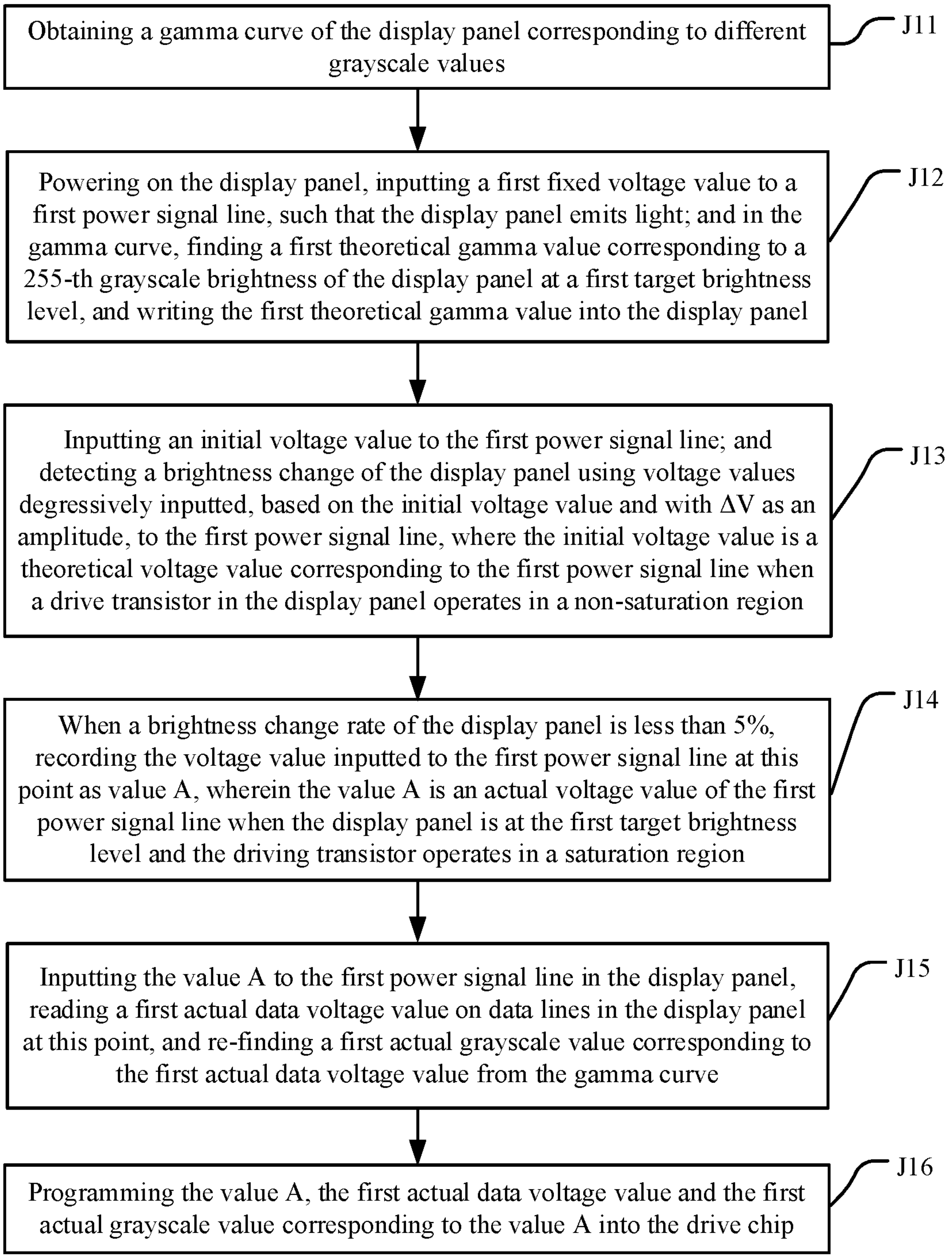
FIG. 2 illustrates a flowchart of an adjustment method according to various embodiments of the present disclosure.

Referring to FIGS. 1-2, FIG. 1 illustrates a planar structural schematic of a display apparatus using an adjustment method according to various embodiments of the present disclosure; and FIG. 2 illustrates a flowchart of an adjustment method according to various embodiments of the present disclosure. The present disclosure provides an adjustment method of a display apparatus. A display apparatus 000 using the adjustment method may include a display panel 10 and a drive chip 20. The display panel 10 may at least include a plurality of drive transistors 101 and a plurality of first power signal line 102. The adjustment method may include following exemplary steps.

The gamma curve of the display panel 10 corresponding to different grayscale values may be obtained.

The display panel 10 may be powered on, and the first fixed voltage value may be inputted to the first power signal line 102, such that the display panel 10 may emit light. In the gamma curve, the first theoretical gamma value corresponding to the 255-th grayscale brightness of the display panel 10 at the first target brightness level may be found. The first theoretical gamma value may be written into the display panel 10.

An initial voltage value may be inputted to the first power signal line 102. The brightness change of the display panel may be detected using voltage values digressively inputted, based on the initial voltage value and with $\Delta V$ as an amplitude, to the first power signal line. The initial voltage value may be a theoretical voltage value corresponding to the first power signal line 102 when the drive transistor 101 in the display panel 10 operates in a non-saturation region.

When the brightness change rate of the display panel 10 is less than 5%, the voltage value inputted to the first power signal line 102 at this point may be recorded as the value A. The value A may be the actual voltage value of the first power signal line 102 when the display panel 10 is at the first target brightness level and the drive transistor 101 operates in a saturation region.

The value A may be inputted to the first power signal line 102 in the display panel 10, the first actual data voltage value on the data line S in the display panel 10 may be read at this point, and the first actual grayscale value corresponding to the first actual data voltage value may be re-found from the gamma curve.

The value A and the first actual data voltage value and the first actual grayscale value corresponding to the value A may be programmed into the drive chip 20.

For example, the adjustment method of the display apparatus is provided in one embodiment. The display apparatus 000 using the adjustment method may include the display panel 10 and the drive chip 20 (as shown in FIG. 1). The display panel 10 may include a binding region BA. The drive chip 20 may need to be bound to the binding region BA of the display panel 10 after the adjustment method is completed, so that the drive chip 20 may be electrically connected to the display panel 10 to form the display apparatus 000. It may be understood that, in one embodiment, the drive chip 20 may not be bound to the display panel 10 before the adjustment method is completed, that is, the adjustment method provided in one embodiment may be performed before the drive chip 20 is bound to the binding region BA of the display panel 10. The display panel 10 in one embodiment may be an organic light-emitting diode display panel. The display panel 10 may include a plurality of sub-pixels 00, a plurality of scan lines G, a plurality of data lines S, a plurality of drive transistors 101 and a plurality of first power signal lines 102. The sub-pixel 00 may include at least the drive transistor 101 or may also include a light-emitting element 103. The light-emitting element 103 may be an organic light-emitting diode. The organic light-emitting diode may be a current-driven element, and a corresponding pixel circuit may need to be configured to provide a drive current for the light-emitting element 103, so that the light-emitting element may emit light. The drive transistor 101, as a part of the pixel circuit, may need to be electrically connected to the first power signal line 102 in the display panel 10. The first power signal line 102 in one embodiment may be understood as a negative power signal line, which may be configured to provide a negative power signal for the pixel circuit of each sub-pixel 00. The first power signal line 102 may be electrically connected to a cathode of the light-emitting element 103. The display panel 10 may also include a plurality of second power signal lines (not shown in drawings). The second power signal line may be understood as a positive power signal line, which may be configured to provide a positive power signal for the pixel circuit of each sub-pixel 00. It should be noted that, in one embodiment, the structure of the display panel 10 may not be described in detail. During an implementation, the structure of the display panel 10 may include, but may not be limited to, the structure shown in FIG. 1, and may also include other structures capable of realizing display functions, which may be understood with reference to the structure of the organic light-emitting diode display panel in the existing technology. The structure of the pixel circuit of the sub-pixel 00 in one embodiment may include, but may not be limited to, the structure shown in FIG. 1, and may also include other transistor structures and the like, which may not be described in detail in one embodiment. FIG. 1 only exemplarily illustrates the structures including the drive transistor 101, the first power signal line 102 and the like mentioned in one embodiment.

In the existing technology, during the formation process of the display apparatus, the value of the first power signal programmed in the drive chip may be first adjusted, such that obtained suitable value of the first power signal may be programmed into the drive chip; after the drive chip is bound on the display panel subsequently, the operating performance of the display apparatus may be optimized. The adjustment process in the existing technology may be to obtain a fixed value of the first power signal after adjusting a small number of display panels. For example, 100 display panels may be adjusted to obtain that the value of the first power signal required by one display panel at a certain brightness is −3.7V, and the value of the first power signal required by another display panel at same brightness is −3.8V. In addition, since the characteristics of the drive transistors in mass-produced display panels fluctuate, the redundancy value of 0.3V may be added. That is, a fixed value of −4V may be taken as the value of required first power signal corresponding to above-mentioned certain brightness. However, in actual application, the value of the first power signal required by the drive transistor in the display panel in the saturation working region may only need −3V, while the drive chip is originally configured to be −4V. After the drive chip is bound, the value transmitted to the first power signal line is −4V, so that the power consumption of 1V may be wasted. Taking the display brightness of 800 nits as an example, the drive current may be expected to be 360 mA (the higher the brightness, the greater the current), so that it is equivalent to causing a waste of power consumption of 360 mV (1 V×360 mA). It may be understood that the drive transistor may be turned on in the saturation working region, and $|Vgs-Vth| \leq |Vds|$. Therefore, it ensures that the drive transistor can generate drive current normally when the pixel circuit included in the subsequent sub-pixel is in the light-emitting working stage. Vgs may be the voltage difference between the gate electrode and the source electrode of the drive transistor, Vth may be the threshold voltage of the drive transistor, and Vds may be the voltage difference between the source electrode and the drain electrode of the drive transistor.

In order to above problems, various embodiments provide an adjustment method of the display apparatus. The adjustment method may include following exemplary steps.

At J11, the gamma curve of the display panel 10 corresponding to different grayscale values may be obtained. The gamma curve may be preset according to the characteristics of the display panel 10. Corresponding data voltage values of the display panel 10 at different grayscale values may be obtained through a preset process. The data voltage may be the data voltage value provided to the sub-pixel 00 by the data line S in the display panel 10. In the gamma curve graph, the abscissa represents the grayscale value, and the ordinate represents the data voltage value. That is, the relationship between the data voltage value and the grayscale value shown in the gamma curve is V=f(g), where V is the data voltage value, g is the grayscale value, and f is the relationship between the data voltage value and the grayscale value (such relationship is the gamma relationship). Adjusting the grayscale value may indicate adjusting the magnitude of the data voltage value, and different data voltage values may represent different brightness.

Figure 3:
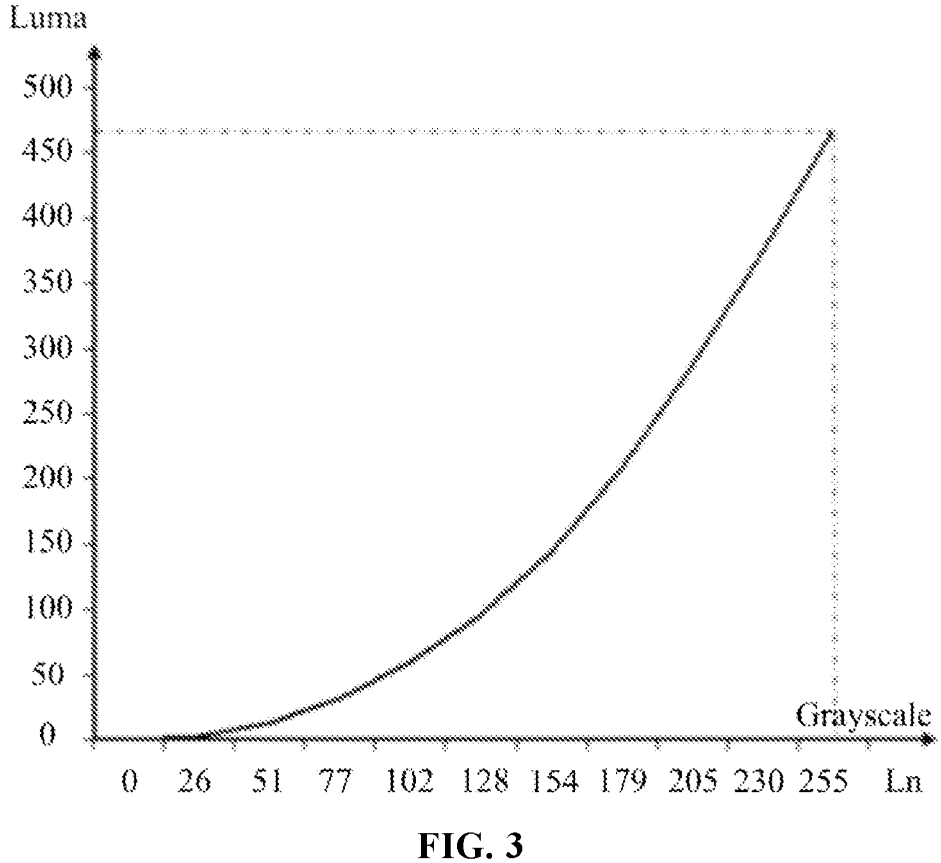
FIG. 3 illustrates a schematic of a brightness response curve of a display apparatus.
Figure 4:
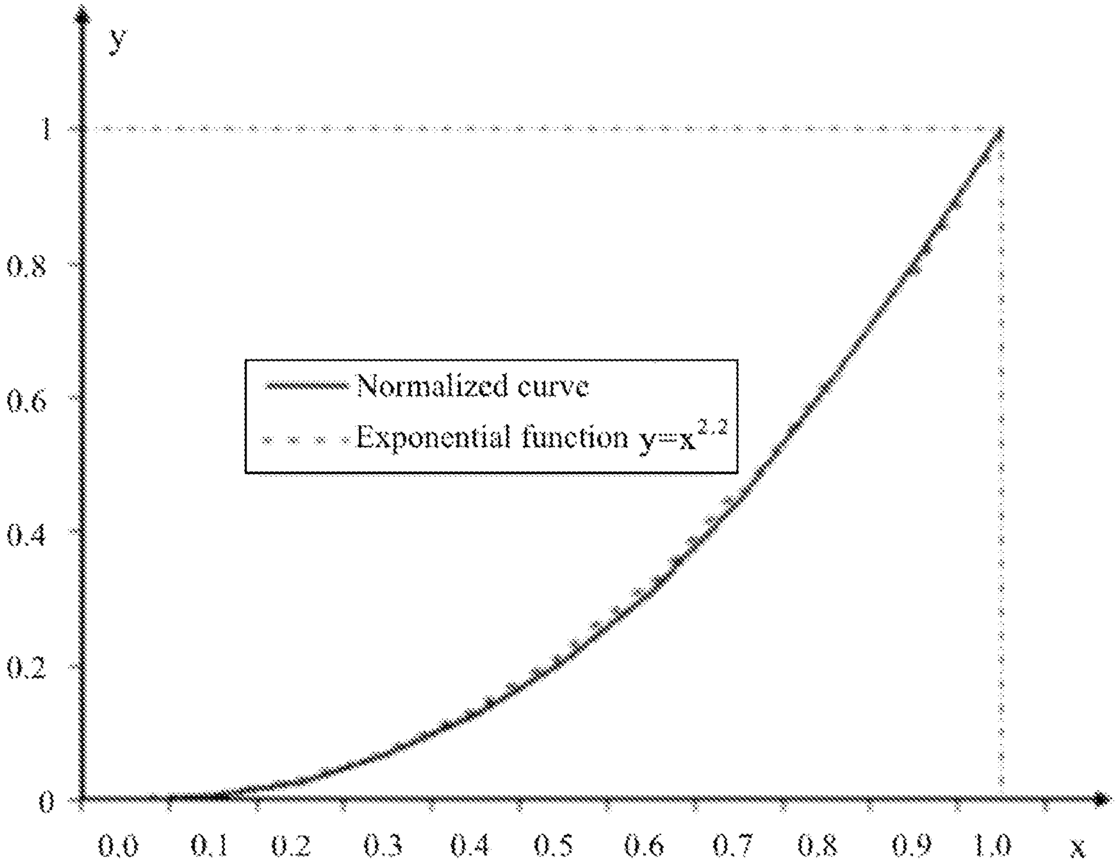
FIG. 4 illustrates a schematic of a response curve in FIG. 3 after normalization process and a reference index curve.

Optionally, referring to FIGS. 3-4, FIG. 3 illustrates a schematic of a brightness response curve of the display apparatus; and FIG. 4 illustrates a schematic of a response curve in FIG. 3 after a normalization process and a reference index curve. In the curve in FIG. 3, the abscissa represents the grayscale value, and the ordinate represents the display brightness. After normalizing the curve in FIG. 3, the gamma curve shown in FIG. 4 may be obtained. It may be noted that the response curve is extremely close to the exponential function curve $y=x^{2.2}$. Therefore, the gamma curve of the display apparatus may be expressed by an exponential function as $y=x^{\gamma}$, where $\gamma$ is the gamma coefficient and actually the power of the exponential function. The gamma coefficients of different display apparatuses may have different requirements. The gamma coefficient of existing cathode ray tube (CRT) display apparatuses may be 2.2 since such display features are more suitable for human visual characteristics. If the gamma coefficient is extremely large, overall image may be relatively dark, and the details in the dark scene of the image may be easily lost; and if the gamma coefficient is extremely small, overall image may be relatively bright, the image may become unclear, and the sense of depth (layering) may deteriorate. The gamma curve in one embodiment is illustrated by taking a gamma coefficient of 2.2 as an example.

At J12, the display panel 10 may be powered on, and the first fixed voltage value may be inputted to the first power signal line 102. It may be understood that the first fixed voltage value may not be provided by the drive chip 20 for the first power signal line 102 in the display panel 10, but directly provided by an external signal source for the first power signal line 102 in the display panel 10. Optionally, at this point, other signal lines in the display panel 10, such as the second power signal line, may be also inputted with a positive power signal, so that the display panel 10 may emit light. Next, in the gamma curve, the first theoretical gamma value corresponding to the 255-th grayscale brightness of the display panel 10 at the first target brightness level may be found, and the first theoretical gamma value may be written into the display panel 10. The first target brightness level may be understood as that the display panel 10 may include multiple brightness levels. For example, the brightness levels, which may be displayed by the display panel 10, may be divided into multiple brightness levels (from high brightness to low brightness) such as 800 nits, 600 nits, 380 nits, 150 nits, 75 nits, 30 nits, and 16 nits, 6.5 nits, 2 nits and the like. Optionally, the first target brightness level may include the highest target brightness level of the display panel 10. That is, in one embodiment, the first target brightness level may be the highest target brightness level of 800 nits among the brightness levels that may be displayed by the display panel 10, which may be taken as an example for illustration. During an implementation, the first target brightness level may also be another brightness level. The grayscale range that may be outputted by the display panel 10 may be selected as 256 grayscales which are from 0 grayscale to the 255-th grayscale. Therefore, the 255-th grayscale brightness of the display panel 10 at the first target brightness level may be interpreted as the highest grayscale brightness of the display 10 at the highest target brightness level. From the preset gamma curve, the first theoretical gamma value corresponding to the 255-th grayscale brightness of the display panel 10 at the first target brightness level may be found. Optionally, the first theoretical gamma value obtained by searching may include the first theoretical data voltage value and the first theoretical grayscale value. In the adjustment method provided in one embodiment, writing the first theoretical gamma value into the display panel 10 may be writing the first theoretical data voltage value into the data line S in the display panel 10, such that the theoretical luminous brightness of the display panel 10 may be the 255-th grayscale brightness at the first target brightness level.

At J13, the initial voltage value may be inputted to the first power signal line 102. Optionally, the initial voltage value may be the theoretical voltage value corresponding to the first power signal line 102 when the drive transistor 101 in the display panel 10 operates in the non-saturation region. Optionally, the initial voltage value may be set to be greater than obtained actual value of the first power signal after subsequent adjustment. That is, it is assumed that corresponding actual voltage value on the first power signal line 102 is −4V when the drive transistor 101 in the display panel 10 operates in the saturation operating region, the initial voltage value inputted by the first power signal line 102 may be corresponding voltage value of the first power signal line 102, for example, −2V which is different from the value of −4V (initial voltage value is greater than −4V) when the drive transistor 101 in the display panel 10 operates in the non-saturation region. Next, based on the initial voltage value, with ΔV as the amplitude (ΔV may be understood as a decrementing value), the brightness change of the display panel 10 may be detected by the brightness detection device using the voltage values degressively inputted to the first power signal line 102 by each ΔV. Optionally, the brightness detection device may not be limited in one embodiment and only need to be able to detect the brightness change values of the display panel 10 under different voltage values of the first power signal line 102. The value of ΔV may be set according to actual requirement of decrementing amplitude, which may not be limited in one embodiment.

At J14, in the process of detecting the brightness change of the display panel 10 through the brightness detection device using the voltage values degressively inputted to the first power signal line by each ΔV, when the brightness change rate of the display panel 10 is less than 5%, the voltage value inputted to the first power signal line 102 at this point may be recorded as the value A. The value A may be the actual voltage value of the first power signal line 102 when the display panel 10 is at the first target brightness level and the drive transistor 101 operates in the saturation region. For example, the first target brightness level is the highest target brightness level among the brightness levels which the display panel 10 can display, so that the value A may correspond to the highest target brightness level among the brightness levels that the display panel 10 can display. That is, it may be understood that through the adjustment method provided in one embodiment, when the display panel 10 is at the first target brightness level and the drive transistor 101 operates in the saturation region, the actual voltage value required by the first power signal line 102 may be the value A.

At J15, at this point, the value A obtained through adjustment may be inputted to the first power signal line 102 in the display panel 10, and the first actual data voltage value on the data line S in the display panel 10 may be read at this moment; and the first actual grayscale value (the abscissa value corresponding to the gamma curve) corresponding to the first actual data voltage value (the ordinate value corresponding to the gamma curve) may be obtained from the gamma curve. The first actual data voltage value and the first actual grayscale value which are obtained may be understood as the first actual gamma value. That is, the first actual gamma value may be the gamma value corresponding to the 255-th grayscale brightness of the display panel 10 at the first target brightness level. The first actual gamma value required by the display panel 10 (including the first actual data voltage value and the first actual grayscale value) may be obtained when the display panel 10 is at the first target brightness level and the drive transistor 101 operates in the saturation region.

At J16, finally, the value A obtained in above adjustment process, and the first actual data voltage value and the first actual grayscale value corresponding to the value A may be all programmed into the drive chip 20.

Through above-mentioned adjustment method in one embodiment, after the drive chip 20 with programmed signal values is bound to the binding region BA of the display panel 10 subsequently, when the display panel 10 needs to display the 255-th grayscale brightness of the first target brightness level, the voltage value provided by the drive chip 20 to the first power signal line 102 in the display panel 10 may be the value A, and the data voltage signal provided for the data line S may be the first actual data voltage value. That is, the drive chip 20 may be used to provide required actual first power signal, such as −3V instead of a theoretical voltage value (such as −4V which is less than the value A), for the drive transistor 101 in the display panel 10 in the saturation working region. If the first target brightness level is the highest target brightness level of 800 nits (the drive current is expected to be 360 mA) among the brightness levels that the display panel 10 can display, the power consumption of 360 mW, that is, 360 mV×(4V−3V), may be saved. That is, after the drive chip 20 that has been programmed is subsequently bound, the display effect of the display apparatus 000 in one embodiment may be ensured, and the display power consumption of the display apparatus 000 may be greatly saved.

For the adjustment method of the display apparatus 000 provided in one embodiment, according to the characteristics of each display panel 10 itself, such as the performance of the drive transistor 101 operating in the saturation working region, the required value A on the first power signal line 102 corresponding to the 255-th grayscale brightness of the display panel 10 at the first target brightness level and the first actual gamma value corresponding to the value A may be obtained by adjustment, which may provide more accurate adjustment process for the drive signal value subsequently programmed into the drive chip 20. In such way, the display apparatus 000 bound with the drive chip 20 subsequently can display the 255-th grayscale brightness at the first target brightness level through the actual first power signal value provided by the drive chip 20, that is, the value A and the first actual gamma value in the display process, which may be beneficial for ensuring overall display effect of the display apparatus 000 while effectively saving power consumption.

It should be noted that, the structure of the display apparatus 000 is exemplarily illustrated in drawings in one embodiment. During an implementation, the structure of the display apparatus 000 may include, but may not be limited to such structure, and may also include other structures capable of realizing display function, which may not be described in detail in one embodiment herein.

It may be understood that the adjustment method of the display apparatus 000 provided in one embodiment may include, but may not be limited to, above process and may also include other processes that can obtain the drive signal value that matches the performance of the display panel 10. In one embodiment, the display panel 10 may be adjusted at the first target brightness level to obtain the value A that matches the performance of the display panel 10 itself, and the first actual data voltage value and the first actual grayscale value corresponding to the value A, which may be taken as example for illustration. During an implementation, the adjustment process for the display panel 10 at other brightness levels may be also included, which may be understood with reference to subsequent embodiments and may not be described in detail in one embodiment herein.

It should be further explained that when the drive chip 20 in one embodiment is bound to the binding region BA of the display panel 10, the first power signal line 102 and the data line S in the display panel 10 may need to be electrically connected to the drive chip 20 through conductive pads (not shown in drawings) of the bonding region BA. FIG. 1 does not illustrate the electrical connection relationship between the drive chip 20 and each of the first power signal line 102 and the data line S respectively. During an implementation, the structure such as a fan-out line may be used to realize the electrical connection between the drive chip 20 and each of the first power signal line 102 and the data line S of the display panel 10 respectively, thereby ensuring that the drive chip 20 may provide the drive signal for above-mentioned signal line. In one embodiment, such connection structure may not be limited, and details may refer to the connection structure in the existing technology for understanding.

Optionally, in one embodiment, the initial voltage value may be inputted to the first power signal line 102. On the basis of the initial voltage value, with ΔV as the amplitude, the brightness change of the display panel 10 may be detected by the brightness detection device using the voltage values degressively inputted to the first power signal line 102 by each ΔV. When the brightness change rate of the display panel 10 is less than 5%, the voltage value inputted to the first power signal line 102 at this point may be recorded as the value A, where ΔV≤0.1V, that is, ΔV is the amplitude magnitude selected to be less than or equal to the value of 0.1V. The step size of the first power signal value of the negative power signal of the drive chip may be about 0.1V. That is, according to the properties of common drive chip, ΔV may be selected to be equal to 0.1V, so that the voltage value inputted to the first power signal line 102 may be decremented by 0.1V each time; or ΔV may also be less than 0.1V. The smaller the decrementing amplitude is, the more accurate the negative power signal value of the first power signal line 102 obtained through adjustment may be when the drive transistor 101 operates in the saturation working region, thereby being further beneficial for improving accuracy of the value A obtained through adjustment.

Optionally, the first power signal line 102 in one embodiment may be understood as a negative power signal line, which may be configured to provide a negative power signal for the pixel circuit of each sub-pixel 00. The first power signal line 102 may be electrically connected to the cathode of the light-emitting element 103. Therefore, when the display panel 10 obtained through above adjustment method is in the first target brightness level and the drive transistor 101 operates in the saturation region, the value A of the first power signal line 102 may be a negative value.

Figure 5:
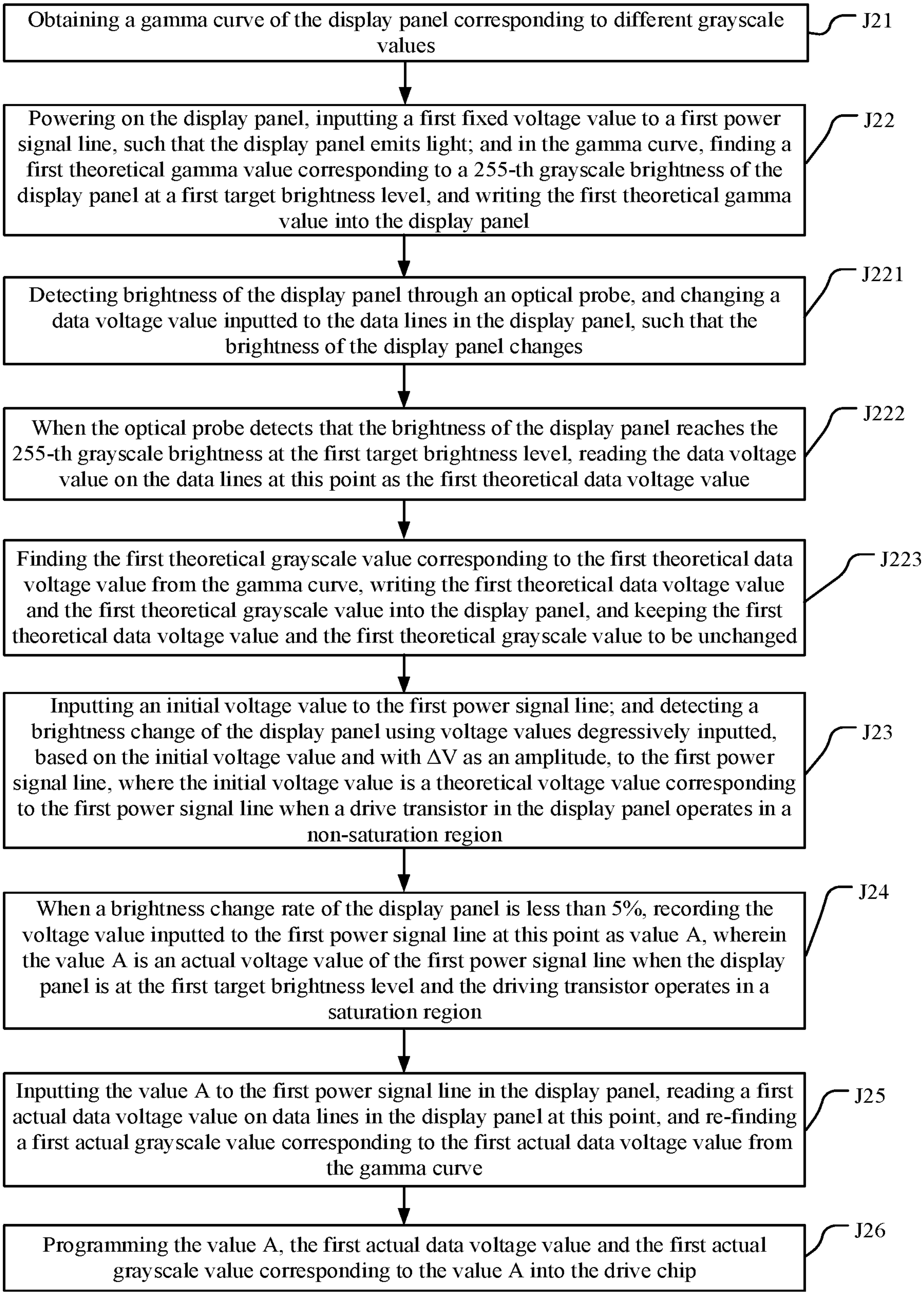
FIG. 5 illustrates another flowchart of an adjustment method according to various embodiments of the present disclosure.

In some optional embodiments, referring to FIGS. 1 and 5, FIG. 5 illustrates another flowchart of an adjustment method according to various embodiments of the present disclosure. In one embodiment, the adjustment method may include following exemplary steps.

At J21, the gamma curve of the display panel 10 corresponding to different grayscale values may be obtained. The gamma curve may be preset according to the characteristics of the display panel 10. Corresponding data voltage values of the display panel 10 at different grayscale values may be obtained through a preset process. The data voltage may be the data voltage value provided to the sub-pixel 00 by the data line S in the display panel 10. In the gamma curve graph, the abscissa represents the grayscale value, and the ordinate represents the data voltage value. Adjusting the grayscale value may indicate adjusting the magnitude of the data voltage value, and different data voltage values may represent different brightness.

At J22, the display panel 10 may be powered on, and the first fixed voltage value may be inputted to the first power signal line 102. It may be understood that the first fixed voltage value may not be provided by the drive chip 20 for the first power signal line 102 in the display panel 10, but directly provided by an external signal source for the first power signal line 102 in the display panel 10. Optionally, at this point, other signal lines in the display panel 10, such as the second power signal line, may be also inputted with a positive power signal, so that the display panel 10 may emit light.

Furthermore, in the gamma curve, the first theoretical gamma value corresponding to the 255-th grayscale brightness of the display panel 10 at the first target brightness level may be found, and the first theoretical gamma value may be written into the display panel 10, which may include flowing exemplary steps.

At J221, the brightness of the display panel 10 may be detected through an optical probe, the data voltage value inputted to the data line S in the display panel 10 may be changed, and the brightness of the display panel 10 may change. Optionally, the optical probe may be an optical measurement probe, such as a CA-410 precision probe or the like.

At J222, when the optical probe detects that the brightness of the display panel 10 reaches the 255-th grayscale brightness at the first target brightness level, the data voltage value on the data line S at this point may be read as the first theoretical data voltage value.

At J223, the first theoretical grayscale value corresponding to the first theoretical data voltage value may be found from the gamma curve. That is, the first theoretical gamma value corresponding to the 255-th grayscale brightness of the display panel 10 at the first target brightness level may be found from the preset gamma curve. The first theoretical gamma value obtained by finding may include the first theoretical data voltage value and the first theoretical grayscale value. The first theoretical data voltage value and the first theoretical grayscale value may be written into the display panel 10 and keep unchanged. That is, the first theoretical data voltage value may be written on the data line S in the display panel 10, such that the theoretical luminous brightness of the display panel 10 may be the 255-th grayscale brightness at the first target brightness level.

For example, it may be understood that the first target brightness level of the display panel 10 in one embodiment may be the highest target brightness level such as 800 nits, the brightness may be detected by the optical probe after the display panel 10 emits light, and by changing the data voltage value inputted to the data line S in the display panel 10, the brightness of the display panel 10 may change with the data voltage value. When the optical probe detects that the brightness of the display panel 10 reaches the highest target brightness level such as 800 nits, the data voltage value on the data line S at this point may be read as the first theoretical data voltage value. Next, the first theoretical grayscale value on the abscissa corresponding to the first theoretical data voltage value on the ordinate may be found from the gamma curve. That is, the first theoretical gamma value corresponding to the 255-th grayscale brightness at the highest target brightness level such as 800 nits may be obtained. Then, the first theoretical data voltage value and corresponding first theoretical grayscale value may be written in the display panel 10 and keep unchanged, which may be for preparation of subsequent adjustment of the value A on the first power signal line 102 of the display panel 10 at the first target brightness level.

At J23, the initial voltage value may be inputted to the first power signal line 102. Optionally, the initial voltage value may be the theoretical voltage value corresponding to the first power signal line 102 when the drive transistor 101 in the display panel 10 operates in the non-saturation region. The initial voltage value may be set to be greater than the actual value of the first power signal when the drive transistor 101 in the display panel 10 operates in the non-saturation working region. Based on the initial voltage value, with ΔV as the amplitude, the brightness change of the display panel 10 may be detected by the brightness detection device using the voltage values degressively inputted to the first power signal line 102 by each ΔV.

At J24, in the process of detecting the brightness change of the display panel 10 through the brightness detection device using the voltage values degressively inputted to the first power signal line by each ΔV, when the brightness change rate of the display panel 10 is less than 5%, the voltage value inputted to the first power signal line 102 at this point may be recorded as the value A. The value A may be the actual voltage value of the first power signal line 102 when the display panel 10 is at the first target brightness level and the drive transistor 101 operates in the saturation region.

At J25, at this point, the value A obtained through adjustment may be inputted to the first power signal line 102 in the display panel 10, and the first actual data voltage value on the data line S in the display panel 10 may be read at this moment; and the first actual grayscale value corresponding to the first actual data voltage value may be obtained from the gamma curve.

At J26, the value A obtained in above adjustment process, and the first actual data voltage value and the first actual grayscale value corresponding to the value A may be all programmed into the drive chip 20 finally.

For the adjustment method of the display apparatus 000 provided in one embodiment, according to the characteristics of each display panel 10 itself, such as performance of the drive transistor 101 operating in the saturation working region, the value A required on the first power signal line 102 corresponding to the 255-th grayscale brightness of the display panel 10 at the first target brightness level and the first actual gamma value corresponding to the value A may be obtained by adjustment, which may be beneficial for ensuring overall display effect of the display apparatus 000 while effectively saving power consumption. In addition, real-time detection of the brightness of the display panel 10 following the change of the data voltage value through the optical probe may be beneficial for accurately detecting the brightness of the display panel 10 when the display panel 10 reaches the 255-th grayscale at the first target brightness level and improving adjustment efficiency.

Figure 6:
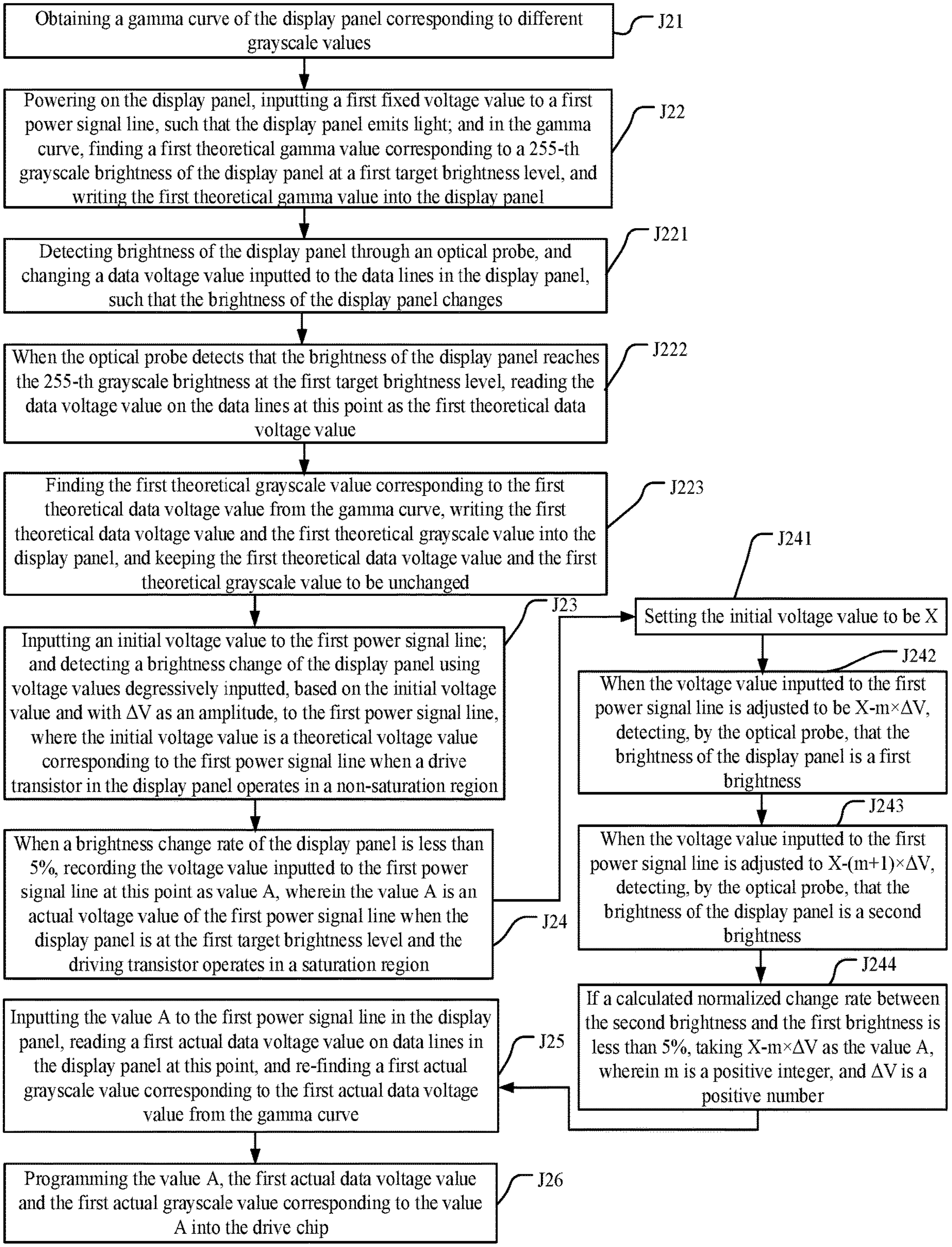
FIG. 6 illustrates another flowchart of an adjustment method according to various embodiments of the present disclosure.

In some optional embodiments, referring to FIGS. 1 and 6, FIG. 6 illustrates another flowchart of an adjustment method according to various embodiments of the present disclosure. In the adjustment method provided in one embodiment, based on the initial voltage value, the voltage value inputted to the first power signal line 102 may be adjusted in steps of ΔV, and the brightness change of the display panel 10 may be detected; and when the brightness change rate of the display panel 10 is less than 5%, the voltage value inputted to the first power signal line 102 at this point may be recorded as the value A, which may include following exemplary steps.

At J241, the initial voltage value may be X.

At J242, when the voltage value inputted to the first power signal line 102 is adjusted to be $X-m\times\Delta V$, the optical probe may detect that the brightness of the display panel 10 is the first brightness.

At J243, when the voltage value inputted to the first power signal line 102 is adjusted to $X-(m+1)\times\Delta V$, the optical probe may detect that the brightness of the display panel 10 is the second brightness.

At J244, if calculated normalization change rate between the second brightness and the first brightness is less than 5%, the value A may be $X-m\times\Delta V$, where m is a positive integer, and ΔV is a positive number.

In one embodiment, it describes that at J24 of the adjustment method provided, based on the initial voltage value, with ΔV as the decrementing amplitude, the voltage value inputted to the first power signal line 102 may be decremented by each ΔV. When the voltage value inputted to the first power signal line 102 is adjusted to be $X-m\times\Delta V$, the optical probe may detect that the brightness of the display panel 10 is the first brightness. In addition, when the voltage value inputted to the first power signal line 102 is adjusted to X−(m+1)×ΔV for next time, the optical probe may detect that the brightness of the display panel 10 is the second brightness. If calculated normalization change rate between the second brightness and the first brightness is less than 5%, X−m×ΔV may be the required value A. That is, when the brightness change rate of the display panel 10 is less than 5%, the voltage value inputted to the first power signal line 102 last time may be taken as the value A. For example, the value X may be −2V, the value m may be 9, and the value ΔV may be 0.1V. When the voltage value inputted to the first power signal line 102 is adjusted to (−2−10×0.1) V, the optical probe may detect that the brightness of the display panel 10 is the first brightness. When the voltage value inputted to the first power signal line 102 is adjusted to (−2−11×0.1) V, the optical probe may detect that the brightness of the display panel 10 is the second brightness. Therefore, the value A may be (−2−10×0.1) V, that is, −3V, which may be the required value A on the first power signal line 102 corresponding to the 255-th grayscale brightness of the display panel 10 at the first target brightness level obtained from adjustment.

Figure 7:
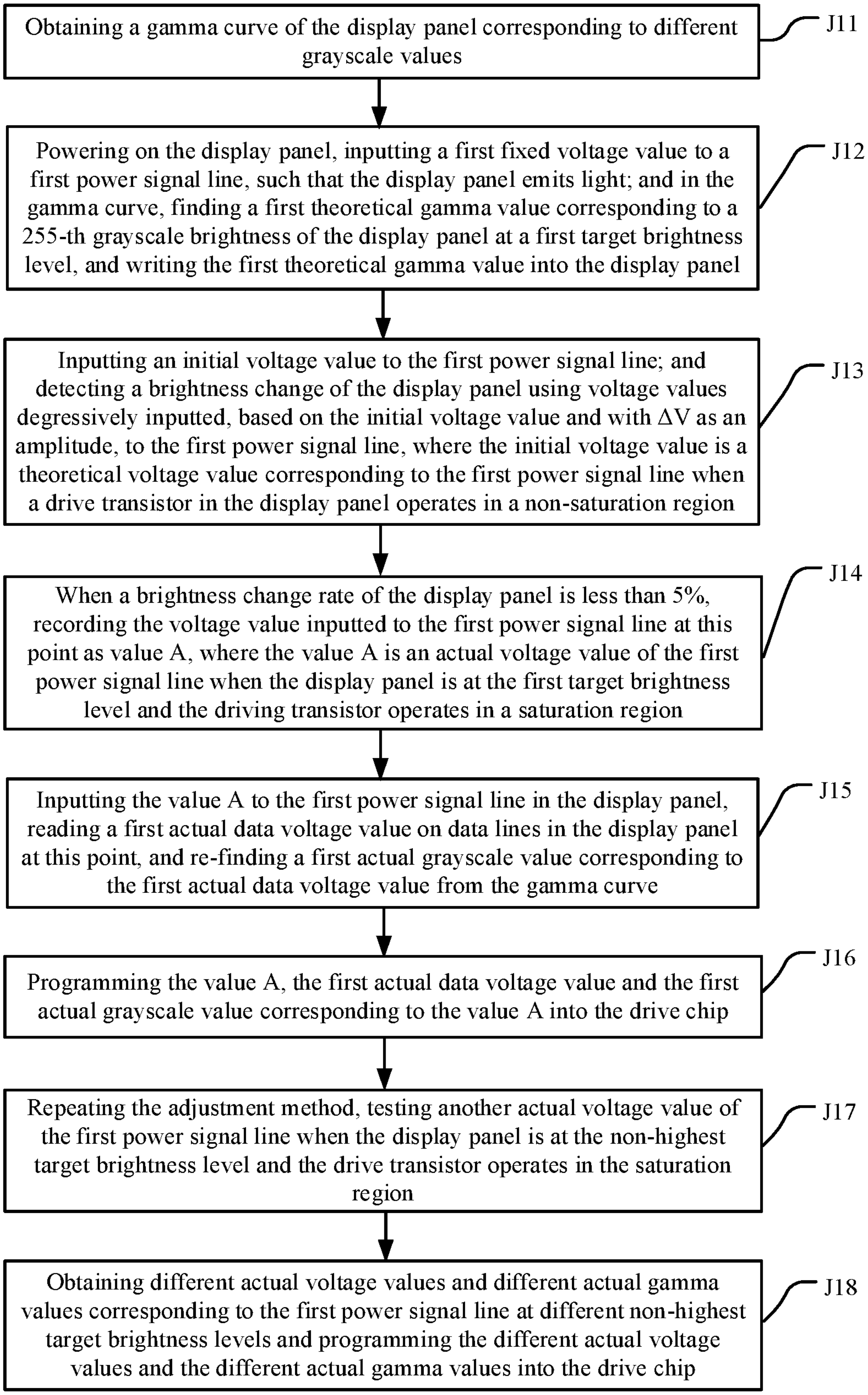
FIG. 7 illustrates another flowchart of an adjustment method according to various embodiments of the present disclosure.

In some optional embodiments, referring to FIGS. 1 and 7, FIG. 7 illustrates another flowchart of an adjustment method according to various embodiments of the present disclosure. In the adjustment method provided in one embodiment, the first target brightness level may also include a non-highest target brightness level. That is, the first target brightness level may not only include the highest target brightness level, but also include the non-highest target brightness levels. Therefore, the adjustment method of the display apparatus 000 may also include following exemplary steps.

At J17, above-mentioned adjustment method may be repeated, and another actual voltage value of the first power signal line 102 may be tested when the display panel 10 is not at the highest target brightness level and the drive transistor 101 operates in the saturation region.

At J18, different actual voltage values and different actual gamma values corresponding to the first power signal line 102 at different non-highest target brightness levels may be obtained one by one and programmed into the drive chip 20.

In one embodiment, it describes that the first target brightness level may not only be understood as the highest target brightness level that can be displayed by the display panel 10, but also include other non-highest target brightness levels that can be displayed by the display panel 10. Therefore, after adjusting the value A of the display panel 10 at the highest target brightness level (such as 800 nits) and the first actual data voltage value and the first actual grayscale value corresponding to the value A, the process of above-mentioned adjustment method may continue to be repeated, and another actual voltage value of the first power signal line 102 may be tested when the display panel 10 is not at the highest target brightness level (such as 600 nits, 380 nits, 150 nits, 75 nits, 30 nits, 16 nits, 6.5 nits, 2 nits or other non-highest target brightness levels) and the drive transistor 101 operates in the saturation region. Finally, different actual voltage values and different actual gamma values corresponding to the first power signal line 102 may be obtained one by one at different non-highest target brightness levels. The value A, and the first actual data voltage value and the first actual grayscale value corresponding to the value A may all be programmed into the drive chip 20.

For the adjustment method of the display apparatus 000 provided in one embodiment, according to the characteristics of each display panel 10 itself, such as performance of the drive transistor 101 operating in the saturation working region, the required value A on the first power signal line 102 corresponding to the 255-th grayscale brightness of the display panel 10 at the first target brightness level and the first actual gamma value corresponding to the value A may be obtained from adjustment; and another actual voltage value of the first power signal line 102 may also be obtained when the drive transistor 101 operates in the saturation region and the first target brightness level includes the non-highest target brightness level. That is, according to the characteristics of each display panel 10, different actual voltage values corresponding to the first power signal line 102 when the drive transistor 101 operates in the saturation region at different target brightness levels may be obtained one by one; and these different actual voltage values and the values obtained from above-mentioned adjustment may all be programmed in the drive chip 20. A more accurate adjustment process may be provided for the drive signal value subsequently programmed into the drive chip 20. Therefore, the display apparatus 000 subsequently bound with the drive chip 20 may use the actual first power signal values and the actual gamma values provided by the drive chip 20 to display the 255-th grayscale brightness at various different first target brightness levels during the display process, thereby being ensuring overall display effect of the display apparatus 000 while effectively saving power consumption. Furthermore, according to the characteristics of the drive transistor 101 itself in the display panel 10, the actual voltage values at different target brightness levels may be obtained by adjustment one by one, which may improve adjustment accuracy and further improve display quality.

Figure 8:
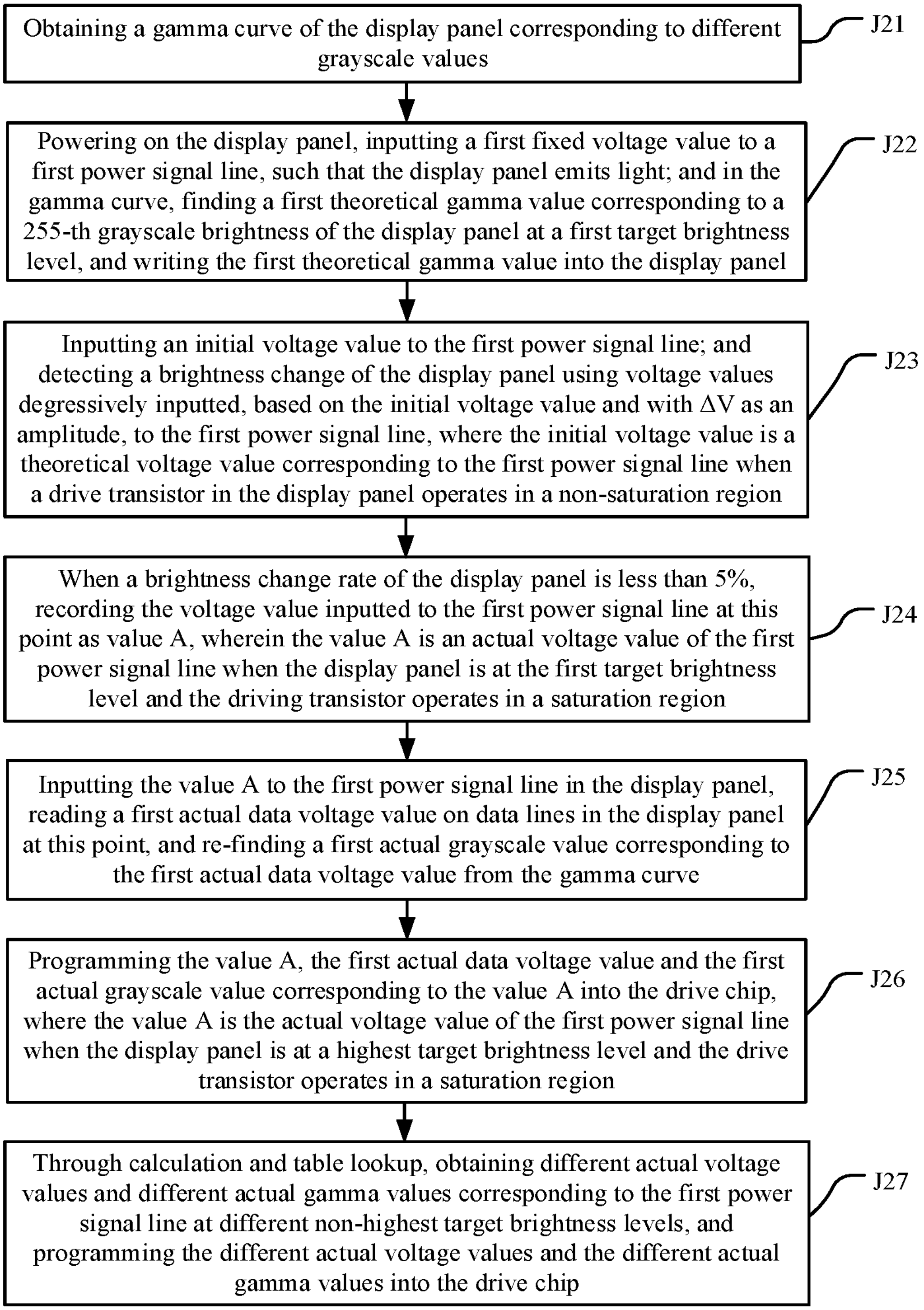
FIG. 8 illustrates another flowchart of an adjustment method according to various embodiments of the present disclosure.

In some optional embodiments, referring to FIGS. 1 and 8, FIG. 8 illustrates another flowchart of an adjustment method according to various embodiments of the present disclosure. In the adjustment method provided in one embodiment, the value A may be the actual voltage value of the first power signal line 102 when the display panel 10 is at its highest target brightness level and the drive transistor 101 operates in the saturation region; and the display panel 10 may also include a plurality of non-highest target brightness levels. In one embodiment, the adjustment method may include following exemplary steps.

At J21, the gamma curve of the display panel 10 corresponding to different grayscale values may be obtained. The gamma curve may be preset according to the characteristics of the display panel 10. Corresponding data voltage values of the display panel 10 at different grayscale values may be obtained through a preset process. The data voltage may be the data voltage value provided to the sub-pixel 00 by the data line S in the display panel 10. In the gamma curve graph, the abscissa represents the grayscale value, and the ordinate represents the data voltage value. Adjusting the grayscale value may indicate adjusting the magnitude of the data voltage value, and different data voltage values may represent different brightness.

At J22, the display panel 10 may be powered on, and the first fixed voltage value may be inputted to the first power signal line 102. It may be understood that the first fixed voltage value may not be provided by the drive chip 20 for the first power signal line 102 in the display panel 10, but directly provided by an external signal source for the first power signal line 102 in the display panel 10. Optionally, at this point, other signal lines in the display panel 10, such as the second power signal line, may be also inputted with a positive power signal, so that the display panel 10 may emit light.

At J23, the initial voltage value may be inputted to the first power signal line 102. Optionally, the initial voltage value may be the theoretical voltage value corresponding to the first power signal line 102 when the drive transistor 101 in the display panel 10 operates in the non-saturation region. The initial voltage value may be set to be greater than the actual value of the first power signal when the drive transistor 101 in the display panel 10 operates in the non-saturation working region. Based on the initial voltage value, with ΔV as the amplitude, the brightness change of the display panel 10 may be detected by the brightness detection device using the voltage values degressively inputted to the first power signal line 102 by each ΔV.

At J24, in the process of detecting the brightness change of the display panel 10 through the brightness detection device using the voltage values degressively inputted to the first power signal line by each ΔV, when the brightness change rate of the display panel 10 is less than 5%, the voltage value inputted to the first power signal line 102 at this point may be recorded as the value A. The value A may be the actual voltage value of the first power signal line 102 when the display panel 10 is at the first target brightness level and the drive transistor 101 operates in the saturation region.

At J25, at this point, the value A obtained through adjustment may be inputted to the first power signal line 102 in the display panel 10, and the first actual data voltage value on the data line S in the display panel 10 may be read at this moment; and the first actual grayscale value corresponding to the first actual data voltage value may be obtained from the gamma curve.

At J26, the value A obtained in above adjustment process, and the first actual data voltage value and the first actual grayscale value corresponding to the value A may be all programmed into the drive chip 20 finally.

At J27, through calculation and table lookup, different actual voltage values and different actual gamma values corresponding to the first power signal line 102 may be obtained at different non-highest target brightness levels and programmed into the drive chip 20.

In one embodiment, it describes that for the display apparatus 000, according to the characteristics of each display panel 10 itself, such as performance of the drive transistor 101 operating in the saturation working region, the required value A on the first power signal line 102 corresponding to the 255-th grayscale brightness of the display panel 10 at the first target brightness level and the first actual gamma value corresponding to the value A may be obtained by adjustment. The first target brightness level may be the highest target brightness level. The value A obtained through above adjustment steps may be the actual voltage value of the first power signal line 102 when the display panel 10 is at its highest target brightness level and the drive transistor 101 operates in the saturation region. Therefore, through calculation and table lookup, when the display panel 10 is in other different non-highest target brightness levels and the drive transistor 101 operates in the saturation region, different actual voltage values and different actual gamma values corresponding to the first power signal line 102 may be obtained and may all be programmed in the drive chip 20. Different actual voltage values and different actual gamma values corresponding to the first power signal line 102 at other non-highest target brightness levels may be obtained by calculation rule and table lookup without repeating above steps, which may ensure the display quality and save display power consumption. It may need to obtain the value A corresponding to the highest target brightness level by adjustment; and through table lookup and calculation, when the drive transistor 101 operates in the saturation region, different actual voltage values and different actual gamma values corresponding to the first power signal line 102 may be obtained at other different non-highest target brightness levels. There is no need to for adjusting each target brightness level of the display panel, thereby greatly improving adjustment efficiency and production efficiency.

Figure 9:
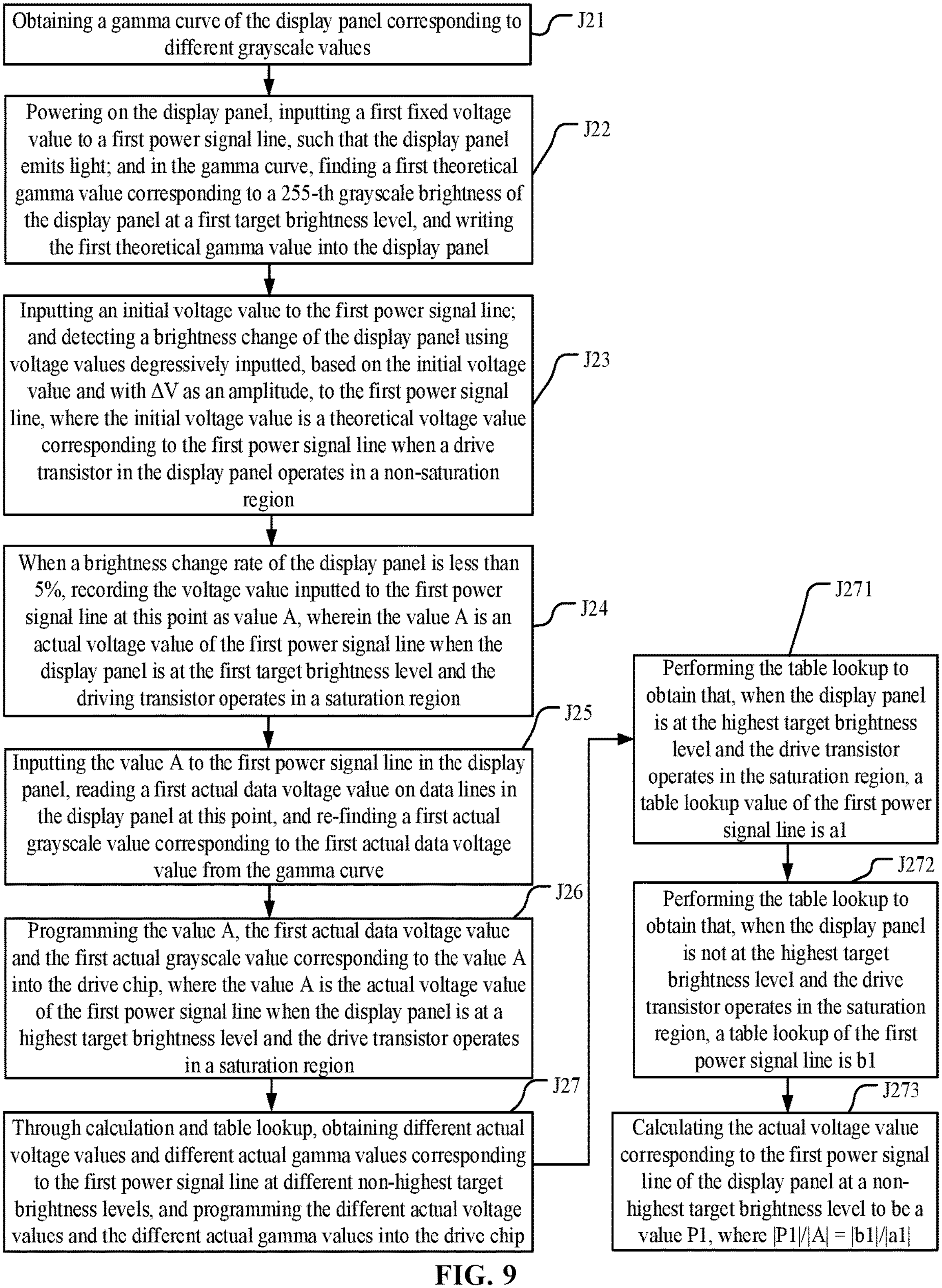
FIG. 9 illustrates another flowchart of an adjustment method according to various embodiments of the present disclosure.

Optionally, referring to FIGS. 1 and 9, FIG. 9 illustrates another flowchart of an adjustment method according to various embodiments of the present disclosure. In one embodiment, through calculation or table lookup, different actual voltage values and different actual gamma values corresponding to the first power signal line 102 may be obtained at different non-highest target brightness levels, which may include following exemplary steps.

At J271, table lookup may be performed to obtain that when the display panel 10 is at the highest target brightness level and the drive transistor 101 operates in the saturation region, the table lookup value of the first power signal line 102 may be a1.

At J272, table lookup may be performed to obtain that when the display panel 10 is not at the highest target brightness level and the drive transistor 101 operates in the saturation region, the table lookup value of the first power signal line 102 may be b1.

At J273, the actual voltage value corresponding to the first power signal line 102 of the display panel 10 in the non-highest target brightness level may be calculated to be the value P1, where $|P1|/|A|-|b1|/|a1|$.

In one embodiment, it describes that through calculation and table lookup, the process of obtaining different actual voltage values and different actual gamma values corresponding to the first power signal line 102 at different non-highest target brightness levels may be, in one embodiment, providing a theoretical table of different theoretical voltage values corresponding to the first power signal line 102 of the display panel 10 at different target brightness levels, as shown in Table 1.

TABLE 1

| Refresh frequency 120 Hz | Target brightness (nit) | Theoretical voltage values corresponding to the first power signal line (V) |
|---|---|---|
| band0 | 2 | −1.4 |
| Band1 | 6.5 | −1.4 |
| Band2 | 16 | −1.4 |
| Band3 | 30 | −1.4 |
| Band4 | 75 | −1.4 |
| Band5 | 75 | −1.4 |
| Band6 | 150 | −1.4 |
| Band7 | 380 | −1.5 |
| Band8 | 600 | −2.7 |
| Band9 | 800 | −4 |

With the refresh frequency of the display panel 10 at 120 Hz, different theoretical voltage values corresponding to the first power signal line 102 of the display panel 10 at different target brightness levels (800 nits, 600 nits, 380 nits, 150 nits, 75 nits, 75 nits, 30 nits, 16 nits, 6.5 nits, and 2 nits) may be shown in Table 1. It may be understood that when the display panel 10 transitions from a high refresh rate to a low refresh rate, a transition process may be needed, so that the division of the target brightness levels of the display panel 10 may include two levels of 75 nits.

Through above-mentioned Table 1, the table lookup may be performed to obtain that when the display panel 10 is at the highest target brightness level and the drive transistor 101 operates in the saturation region, the table lookup value of the first power signal line 102 may be a1. Exemplarily, as shown in Table 1, when the display panel 10 is at the highest target brightness level, that is, the level of 800 nits, and the drive transistor 101 operates in the saturation region, the table lookup value of the first power signal line 102 may be −4V.

Through above-mentioned Table 1, the table lookup may be performed to obtain that when the display panel 10 is not at the highest target brightness level and the drive transistor 101 operates in the saturation region, the table lookup value of the first power signal line 102 may be b1. Exemplarily, as shown in Table 1, when the display panel 10 is at the level of 600 nits and the drive transistor 101 operates in the saturation region, the table lookup value of the first power signal line 102 may be −2.7V. In addition, when the display panel 10 is at the highest target brightness level, for example, when the display panel 10 is at the level of 800 nits and the drive transistor 101 operates in the saturation region, actual value of the first power signal line 102 may be the value A. Therefore, when the display panel 10 is at the non-highest target brightness level (for example, the display panel 10 is at the level of 600 nits), the actual voltage value corresponding to the first power signal line 102 may be obtained as the value P1 through calculation, where $|P1|/|A|=|b1|/|a1|$. Assuming that the value A is equal to −3V after adjustment, a1 is equal to −4V from the table lookup, and b1 is equal to −2.7V from the table lookup, then $|b1|/|a1|=0.675$ and $|P1|=0.675\times3=2.025V$. Negative integer (since the negative power signal value is negative) may be taken to obtain that the value of P1 is −2V. The value P1 calculated by looking up the table when the display panel 10 is not at the highest target brightness level (for example, the display panel 10 is at the level of 600 nits) may be programmed into the drive chip 20. When the display apparatus actually displays the brightness of the non-highest target brightness level, it is equivalent to saving power consumption of 0.7V multiplied by the drive current corresponding to the non-highest target brightness level, which may accelerate the adjustment process, improve production efficiency, but also satisfy the requirement of reducing the power consumption of the display apparatus.

It may be understood that different theoretical voltage values corresponding to the first power signal line 102 of the display panel 10 at different target brightness levels in Table 1 may be merely exemplarily. During an implementation, the values in Table 1 may be obtained according to different display panels 10. An optional configuration may be exemplarily illustrated in one embodiment, which may include, but may not be limited to, Table 1 during an implementation.

Optionally, through above-mentioned Table 1, the table lookup may be performed to obtain that when the display panel 10 is not at the highest target brightness level and the drive transistor 101 operates in the saturation region, the table lookup value of the first power signal line 102 may be b1. It may also be that when the display panel 10 is at the level of 380 nits and the drive transistor 101 operates in the saturation region, the table lookup value of the first power signal line 102 may be −1.5V as shown in Table exemplarily. In addition, when the display panel 10 is at the highest target brightness level, for example, the display panel 10 is at the level of 800 nits and the drive transistor 101 operates in the saturation region, the actual value of the first power signal line 102 may be the value A. Therefore, when the display panel 10 is in the non-highest target brightness level (for example, the display panel 10 is at the level of 380 nits), the actual voltage value corresponding to the first power signal line 102 may be obtained as the value P1 through calculation, where $|P1|/|A|=|b1|/|a1|$. Assuming that the value A is equal to −3V after adjustment, a1 is equal to −4V from the table lookup, and b1 is equal to −1.5V from the table lookup, then $|b1|/|a1|-0.375$, and $|P1|=0.375\times3=1.125V$. Negative integer (since the negative power signal value is negative) may be performed to obtain that the value of P1 is −1V. Therefore, when the drive transistor 101 of the display panel 10 operates in the saturation region at the non-highest target brightness level (for example, the display panel 10 is at the level of 380 nits), the actual value of the first power signal line 102 may be −1V. When the display apparatus actually displays the brightness of the non-highest target brightness level, it is equivalent to saving power consumption of 0.5V multiplied by the drive current corresponding to the non-highest target brightness level.

It should be noted that, in one embodiment, when the drive transistor 101 operates in the saturation region at other non-highest target brightness levels, the table look-up and calculation process of the actual value of the first power signal line 102 may not be described in detail, which may be understood by referring to above-mentioned embodiments.

Figure 10:
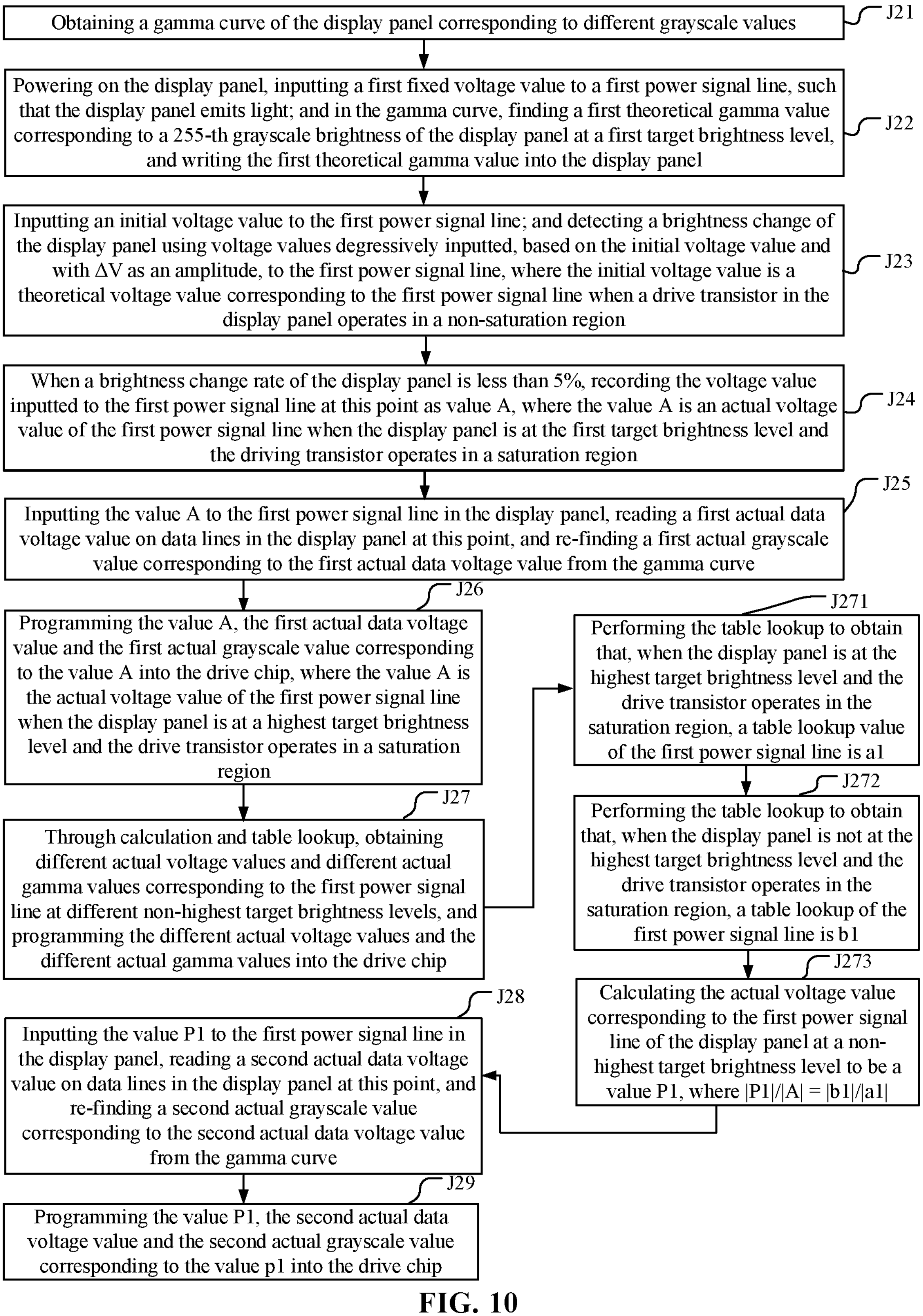
FIG. 10 illustrates another flowchart of an adjustment method according to various embodiments of the present disclosure.

In some optional embodiments, referring to FIGS. 1 and 10, FIG. 10 illustrates another flowchart of an adjustment method according to various embodiments of the present disclosure. The adjustment method of the display apparatus provided in one embodiment may further include following exemplary steps.

At J28, the value P1 may be inputted to the first power signal line 102 in the display panel 10, the second actual data voltage value on the data line S in the display panel 10 may be read at this point, and the second actual grayscale value corresponding to the second actual data voltage value may be re-found from the gamma curve.

At J29, the value P1, and the second actual data voltage value and the second actual grayscale value corresponding to the value P1 may be programmed into the drive chip 20.

In one embodiment, it describes that in the adjustment method of the display apparatus 000, by calculation and table lookup, after obtaining a different actual voltage value corresponding to the first power signal line 102 at a different non-highest target brightness level to be the value P1, the value of P1 may be inputted to the first power signal line 102 in the display panel 10, and the second actual data voltage value on the data line S in the display panel 10 may be read at this point. Next, the second actual grayscale value corresponding to the second actual data voltage value from the gamma curve may be obtained again. The second actual data voltage value and the second actual grayscale value may be the actual gamma value corresponding to the actual voltage value P1 of the first power signal line 102 when the display panel 10 is at the non-highest target brightness level. After obtaining the actual voltage values and actual gamma values at different non-highest target brightness levels, each value P1 and the second actual data voltage value and second actual grayscale value corresponding to each value P1 may be programmed into the drive chip 20, and the programming operation of the drive chip 20 may be completed. Furthermore, after the drive chip 20 which is completely and subsequently programmed is bound to the display panel 10, the display apparatus 000 may perform display according to different actual voltage values and actual gamma values, which may be beneficial for reducing overall display power consumption of the display apparatus 000.

Figure 11:
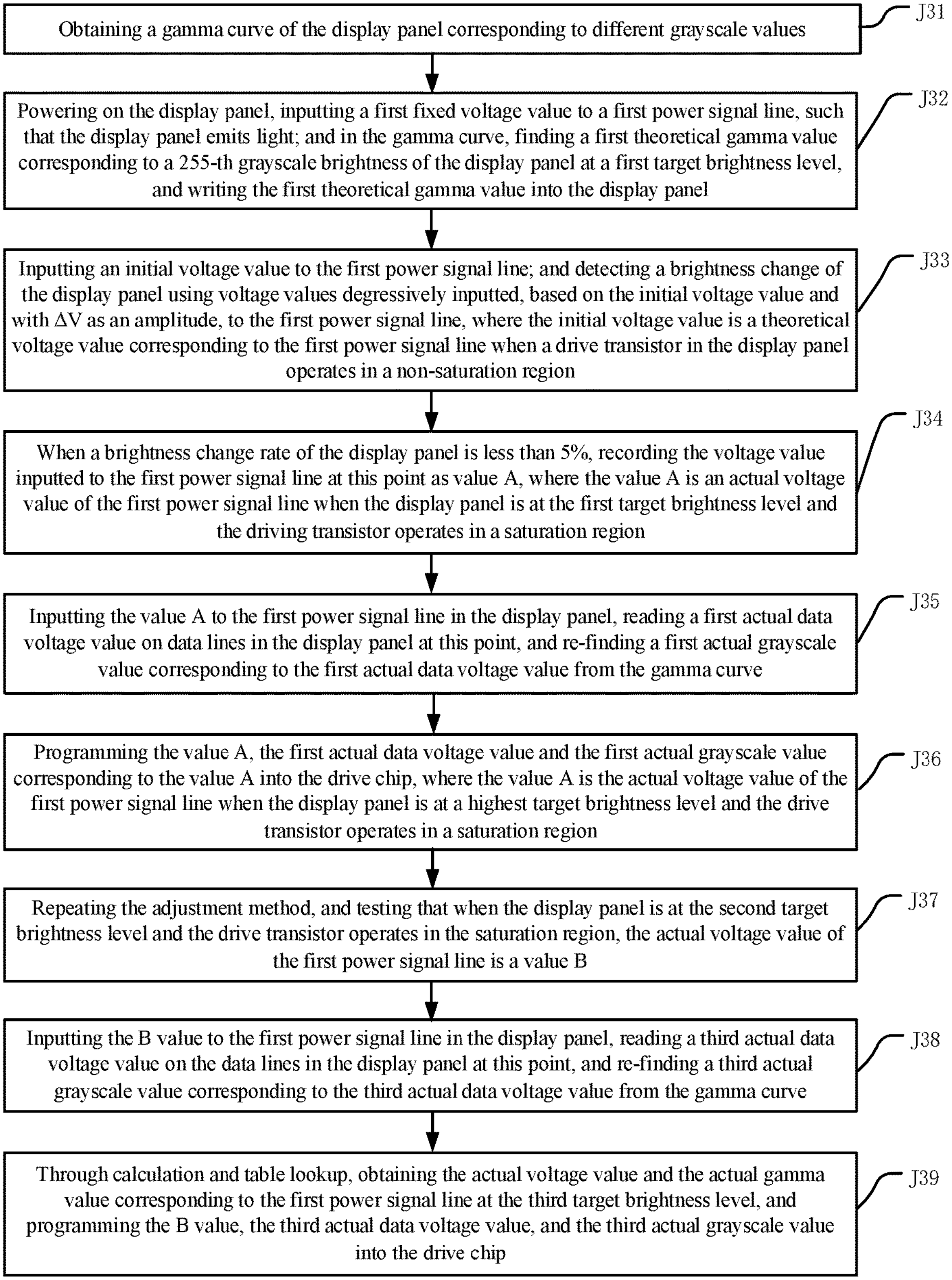
FIG. 11 illustrates another flowchart of an adjustment method according to various embodiments of the present disclosure.

In some optional embodiments, referring to FIGS. 1 and 11, FIG. 11 illustrates another flowchart of an adjustment method according to various embodiments of the present disclosure. In the adjustment method provided by one embodiment, the value A may be the actual voltage value of the first power signal line 102 when the display panel 10 is at the highest target brightness level and the drive transistor 101 operates in the saturation region. The display panel 10 may also include a plurality of non-highest target brightness levels, where the plurality of non-highest target brightness levels may at least include the second target brightness level and the third target brightness level. In one embodiment, the adjustment method may include following exemplary steps.

At J31, the gamma curve of the display panel 10 corresponding to different grayscale values may be obtained. The gamma curve may be preset according to the characteristics of the display panel 10. Corresponding data voltage values of the display panel 10 at different grayscale values may be obtained through a preset process. The data voltage may be the data voltage value provided to the sub-pixel 00 by the data line S in the display panel 10. In the gamma curve graph, the abscissa represents the grayscale value, and the ordinate represents the data voltage value. Different data voltage values may represent different brightness.

At J32, the display panel 10 may be powered on, and the first fixed voltage value may be inputted to the first power signal line 102, so that the display panel 10 may emit light. Next, in the gamma curve, the first theoretical gamma value corresponding to the 255-th grayscale brightness of the display panel 10 at the first target brightness level may be found, and the first theoretical gamma value may be written into the display panel 10. The first target brightness level may be understood as that the display panel 10 may include multiple brightness levels. For example, the brightness levels, which may be displayed by the display panel 10, may be divided into multiple brightness levels (from high brightness to low brightness) such as 800 nits, 600 nits, 380 nits, 150 nits, 75 nits, 30 nits, and 16 nits, 6.5 nits, 2 nits and the like. Optionally, the first target brightness level may be the highest target brightness level of the display panel 10. That is, in one embodiment, the first target brightness level may be the highest target brightness level of 800 nits among the brightness levels that may be displayed by the display panel 10, which may be taken as an example for illustration. The grayscale range that may be outputted by the display panel 10 may be selected as 256 grayscales which are from 0 grayscale to the 255-th grayscale. Therefore, the 255-th grayscale brightness of the display panel 10 at the first target brightness level may be interpreted as the highest grayscale brightness of the display panel 10 at the highest target brightness level. From the preset gamma curve, the first theoretical gamma value corresponding to the 255-th grayscale brightness of the display panel 10 at the highest target brightness level may be found. The first theoretical gamma value obtained by searching may include the first theoretical data voltage value and the first theoretical grayscale value. The first theoretical data voltage value may be written into the data line S in the display panel 10, such that the theoretical luminous brightness of the display panel 10 may be the 255-th grayscale brightness at the first target brightness level.

At J33, the initial voltage value may be inputted to the first power signal line 102. Next, based on the initial voltage value, with ΔV as the amplitude (ΔV may be understood as a decrementing value), the brightness change of the display panel 10 may be detected by the brightness detection device using the voltage values degressively inputted to the first power signal line 102 by each ΔV. Optionally, the brightness detection device may not be limited in one embodiment and only need to be able to detect the brightness change values of the display panel 10 under different voltage values of the first power signal line 102. The value of ΔV may be less than or equal to 0.1V. Optionally, the value of ΔV may be equal to 0.1V.

At J34, in the process of detecting the brightness change of the display panel 10 through the brightness detection device using the voltage values degressively inputted to the first power signal line by each ΔV, when the brightness change rate of the display panel 10 is less than 5%, the voltage value inputted to the first power signal line 102 at this point may be recorded as the value A. The value A may be the actual voltage value of the first power signal line 102 when the display panel 10 is at the highest target brightness level and the drive transistor 101 operates in the saturation region. That is, it can be understood that through the adjustment method provided in one embodiment, when the display panel 10 is at the highest target brightness level and the drive transistor 101 operates in the saturation region, the actual voltage value required by the first power signal line 102 may be the value A.

At J35, at this point, the value A obtained through adjustment may be inputted to the first power signal line 102 in the display panel 10, and the first actual data voltage value on the data line S in the display panel 10 may be read at this moment; and the first actual grayscale value (the abscissa value corresponding to the gamma curve) corresponding to the first actual data voltage value (the ordinate value corresponding to the gamma curve) may be obtained from the gamma curve. The first actual data voltage value and the first actual grayscale value which are obtained may be understood as the first actual gamma value. That is, the first actual gamma value may be the gamma value corresponding to the 255-th grayscale brightness of the display panel 10 at the highest target brightness level. The first actual gamma value required by the display panel 10 (including the first actual data voltage value and the first actual grayscale value) may be obtained when the display panel 10 is at the highest target brightness level and the drive transistor 101 operates in the saturation region.

At J36, finally, the value A obtained in above adjustment process, and the first actual data voltage value and the first actual grayscale value corresponding to the value A may be all programmed into the drive chip 20.

At J37, the steps of above-mentioned adjustment method may be repeated. For example, above-mentioned steps J32-J34 may be repeated. The display panel 10 may be powered on, and the second fixed voltage value may be inputted to the first power signal line 102, so that the display panel 10 may emit light. In the gamma curve, the second theoretical gamma value corresponding to the 255-th grayscale brightness of the display panel 10 at the second target brightness level may be found, and the second theoretical gamma value may be written into the display panel 10. The second initial voltage value may be inputted to the first power signal line 102; and based on the second initial voltage value, with ΔV as the amplitude, the brightness change of the display panel 10 may be detected using the voltage values degressively inputted to the first power signal line 102, where the second initial voltage value may be the theoretical voltage value corresponding to the first power signal line 102 when the drive transistor 101 in the display panel 10 operates in the non-saturation region. When the brightness change rate of the display panel 10 is less than 5%, the voltage value inputted to the first power signal line 102 at this point may be recorded as the value B. After adjustment, the actual voltage value of the first power signal line 102 may be value B when the display panel 10 is at the second target brightness level and the drive transistor 101 operates in the saturation region. The second target brightness level may be understood as one of multiple non-highest target brightness levels among the brightness levels that can be displayed by the display panel 10. Optionally, the second target brightness level may be a selected brightness level in which the voltage value of the first power signal line 102 does not change theoretically. As shown in above Table 1, the theoretical voltage values on the first power signal line 102 of the display panel 10 at the brightness levels starting from 150 nits and below may not change substantially. Therefore, if the first target brightness level is the highest brightness level of 800 nits, the second target brightness level may be the non-highest target brightness level of 150 nits. Above-mentioned steps J31-J34 may be repeated to obtain the value B. The value B may be understood as the actual voltage value of the first power signal line 102 when the display panel 10 is at the second target brightness level and the drive transistor 101 operates in the saturation region. It may be understood that in one embodiment, above-mentioned adjustment steps repeated to obtain the value B may be briefly described. For specific implementation, reference may be made to detailed description in above-mentioned embodiments for understanding.

At J38, at this point, the value B obtained through adjustment may be inputted to the first power signal line 102 in the display panel 10, and the third actual data voltage value on the data line S in the display panel 10 may be read at this point. Next, the third actual grayscale value (the abscissa value corresponding to the gamma curve) corresponding to the third actual data voltage value (the ordinate value corresponding to the gamma curve) may be found from the gamma curve again; and the third actual data voltage value and the third actual grayscale value which are obtained may be understood as the third actual gamma value. That is, the third actual gamma value may be the gamma value corresponding to the 255-th grayscale brightness of the display panel 10 at the second target brightness level. The third actual gamma value (including the third actual data voltage value and the third actual grayscale value) required by the display panel 10 may be obtained when the display panel 10 is at the second target brightness level and the drive transistor 101 operates in the saturation region.

At J39, through calculation and table lookup, the actual voltage value and the actual gamma value corresponding to the first power signal line 102 at the third target brightness level may be obtained; and the value B, the third actual data voltage value, and the third actual grayscale value may be programmed into the drive chip 20. Optionally, the third target brightness level may be understood as one of multiple non-highest target brightness levels among the brightness levels that may be displayed by the display panel 10, except for the second target brightness level. The second target brightness level may be a selected brightness level in which the voltage value of the first power signal line 102 does not change theoretically. For example, the theoretical voltage values on the first power signal line 102 of the display panel 10 at the brightness levels starting from 150 nits and below may not change substantially as shown in above Table 1. Therefore, if the first target brightness level is the highest brightness level of 800 nits, the second target brightness level may be the non-highest target brightness level of 150 nits, and the third target brightness level may be any non-highest target brightness level between 150 nits and 800 nits.

In one embodiment, it describes that for the adjustment method of the display apparatus, according to the characteristics of each display panel 10 itself, such as performance of the drive transistor 101 operating in the saturation working region, the required value A on the first power signal line 102 corresponding to the 255-th grayscale brightness of the display panel 10 at the first target brightness level and the first actual gamma value corresponding to the value A may be obtained through adjustment; and the required value B on the first power signal line 102 corresponding to the 255-th grayscale brightness of the display panel 10 at the second target brightness level and the third actual gamma value corresponding to the value B may also be obtained through adjustment, which may provide an accurate adjustment process for the drive signal value subsequently programmed into the drive chip 20. In such way, during the displaying process, the display apparatus 000 subsequently bound with the drive chip 20 may display the 255-th grayscale brightness at the first target brightness level through the actual first power signal value provided by the drive chip 20, that is, the value A and the first actual gamma value; and may display the 255-th grayscale brightness at the second target brightness level through the actual first power signal value provided by the drive chip 20, that is, the value B and the third actual gamma value, which may be beneficial for ensuring overall display effect of the display apparatus 000 while effectively saving power consumption. Furthermore, above two actual values may also be configured to look up the table and calculate the actual values of the first power signal at other non-highest target brightness levels, which may be beneficial for improving calculation accuracy. In addition, the actual values of the first power signal of the display panel 10 at the non-highest target brightness levels except for the second target brightness level may be obtained through calculation and table lookup. Different actual voltage values and different actual gamma values corresponding to the first power signal line 102 at other non-highest target brightness levels may be obtained without repeating above steps one by one and may be obtained by calculation and table lookup. There is no need to measure each target brightness level of the display panel 10, but only need to measure the actual voltage value of the first power signal at two corresponding target brightness levels, thereby further improving adjustment accuracy and improving production efficiency.

Figure 12:
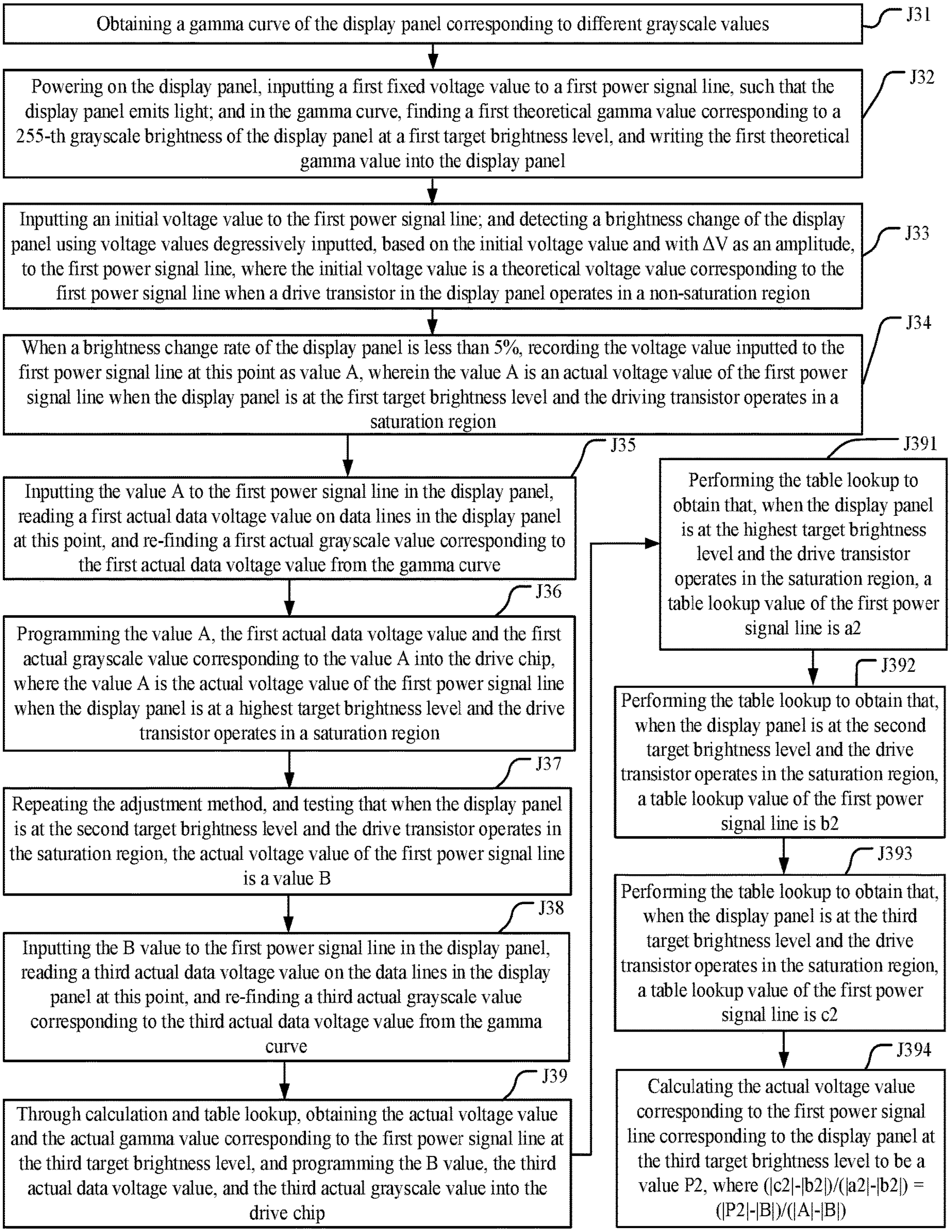
FIG. 12 illustrates another flowchart of an adjustment method according to various embodiments of the present disclosure.

Optionally, referring to FIGS. 1 and 12, FIG. 12 illustrates another flowchart of an adjustment method according to various embodiments of the present disclosure. In one embodiment, the actual voltage value and the actual gamma value corresponding to the first power signal line 102 at the third target brightness level may be obtained through calculation and table lookup, which may include following exemplary steps.

At J391, the table lookup may be performed to obtain that when the display panel 10 is at the highest target brightness level and the drive transistor 101 operates in the saturation region, the table lookup value of the first power signal line 102 is a2.

At J392, the table lookup may be performed to obtain that when the display panel 10 is at the second target brightness level and the drive transistor 101 operates in the saturation region, the table lookup value of the first power signal line 102 is b2.

At J393, the table lookup may be performed to obtain that when the display panel 10 is at the third target brightness level and the drive transistor 101 operates in the saturation region, the table lookup value of the first power signal line 102 is c2.

At J394, the actual voltage value corresponding to the first power signal line 102 of the display panel 10 at the third target brightness level may be calculated as the value P2, where $$(|c2|-|b2|)/(|a2|-|b2|)=(|P2|-|B|)/(|A|-|B|).$$

In one embodiment, it describes that the specific process of obtaining the actual voltage value and the actual gamma value corresponding to the first power signal line 102 at the third target brightness level in the non-highest target brightness level through calculation or table lookup may be as follows. In one embodiment, the theoretical table of different theoretical voltage values corresponding to the first power signal line 102 of the display panel 10 at different target brightness levels may be provided, as shown in Table 1. Table 1 may not be described in detail in one embodiment.

With the refresh frequency of the display panel 10 at 120 Hz, different theoretical voltage values corresponding to the first power signal line 102 of the display panel 10 at different target brightness levels (800 nits, 600 nits, 380 nits, 150 nits, 75 nits, 75 nits, 30 nits, 16 nits, 6.5 nits, and 2 nits) may be shown in Table 1. It may be understood that when the display panel 10 transitions from a high refresh rate to a low refresh rate, a transition process may be needed, so that the division of the target brightness levels of the display panel 10 may include two levels of 75 nits.

Through above-mentioned Table 1, the table lookup may be performed to obtain that when the display panel 10 is at the highest target brightness level (that is, the first target brightness level) and the drive transistor 101 operates in the saturation region, the table lookup value of the first power signal line 102 may be a2. Exemplarily, as shown in Table 1, when the display panel 10 is at the highest target brightness level (that is, the level of 800 nits) and the drive transistor 101 operates in the saturation region, the table lookup value of the first power signal line 102 may be −4V, that is, a2 may be −4V.

Through above-mentioned Table 1, the table lookup may be performed to obtain that when the display panel 10 is at the second target brightness level and the drive transistor 101 operates in the saturation region, the table lookup value of the first power signal line 102 may be b2. Exemplarily as shown in Table 1, when the display panel 10 is at the level of 150 nits and the drive transistor 101 operates in the saturation region, the table lookup value of the first power signal line 102 may be −1.4V, that is, b2 may be −1.4V.

Through above-mentioned Table 1, the table lookup may be performed to obtain that when the display panel 10 is at the third target brightness level and the drive transistor 101 operates in the saturation region, the table lookup value of the first power signal line 102 may be c2. Exemplarily as shown in Table 1, when the display panel 10 is at the level of 600 nits and the drive transistor 101 operates in the saturation region, the table lookup value of the first power signal line 102 may be −2.7V, that is, c2 may be −2.7V.

When the display panel 10 is at the highest target brightness level (i.e., the first target brightness level), for example, when the display panel 10 is at the level of 800 nits and the drive transistor 101 operates in the saturation region, the actual value of the first power signal line 102 may be the value A. When the display panel 10 is at the second target brightness level, for example, the display panel 10 is at the level of 150 nits and the drive transistor 101 operates in the saturation region, the actual value of the first power signal line 102 may be the value B. Next, when the display panel 10 is at the third target brightness level (for example, the display panel 10 is at the level of 600 nits), the actual voltage value corresponding to the first power signal line 102 may be calculated as the value P2, where $(|c2|-|b2|)/(|a2|-|b2|)=(|P2|-|B|)/(|A|-|B|)$. Assuming that the value A is equal to −3V after adjustment, the value B is equal to −1V after adjustment, the a2 value is equal to −4V from table lookup, the b2 value is equal to −1.4V from table lookup, and the c2 value is equal to −2.7V from table lookup, $(|c2|-|b2|)/(|a2|-|b2|)=(2.7-1.4)/(4-1.4)=0.5$. Therefore, $|P2|$ may be calculated to be 2V through $(|P2|-|B|)/(|A|-|B|)=(|P2|-1)/(3-1)=0.5$. By taking negative integer (since the negative power signal value is a negative number), the P2 value may be −2V. Therefore, the P2 value calculated by looking up the table when the display panel 10 is at the third target brightness level (for example, the display panel 10 is in the level of 600 nits may be programmed into the drive chip 20. When the display apparatus actually displays the brightness of the third target brightness level, it is equivalent to saving power consumption of 0.7V multiplied by the drive current corresponding to the third target brightness level, thereby not only speeding up the adjustment process, improving production efficiency, but also satisfying the demand for reducing power consumption of the display apparatus.

It may be understood that different theoretical voltage values corresponding to the first power signal line 102 of the display panel 10 at different target brightness levels in Table 1 may be merely exemplarily. During an implementation, the values in Table 1 may be obtained according to different display panels 10. An optional configuration may be exemplarily illustrated in one embodiment, which may include, but may not be limited to, Table 1 during an implementation.

It should be noted that, in one embodiment, when the drive transistor 101 operates in the saturation region at other non-highest target brightness levels, the table look-up and calculation process of the actual value of the first power signal line 102 may not be described in detail, which may be understood by referring to above-mentioned embodiments.

Figure 13:
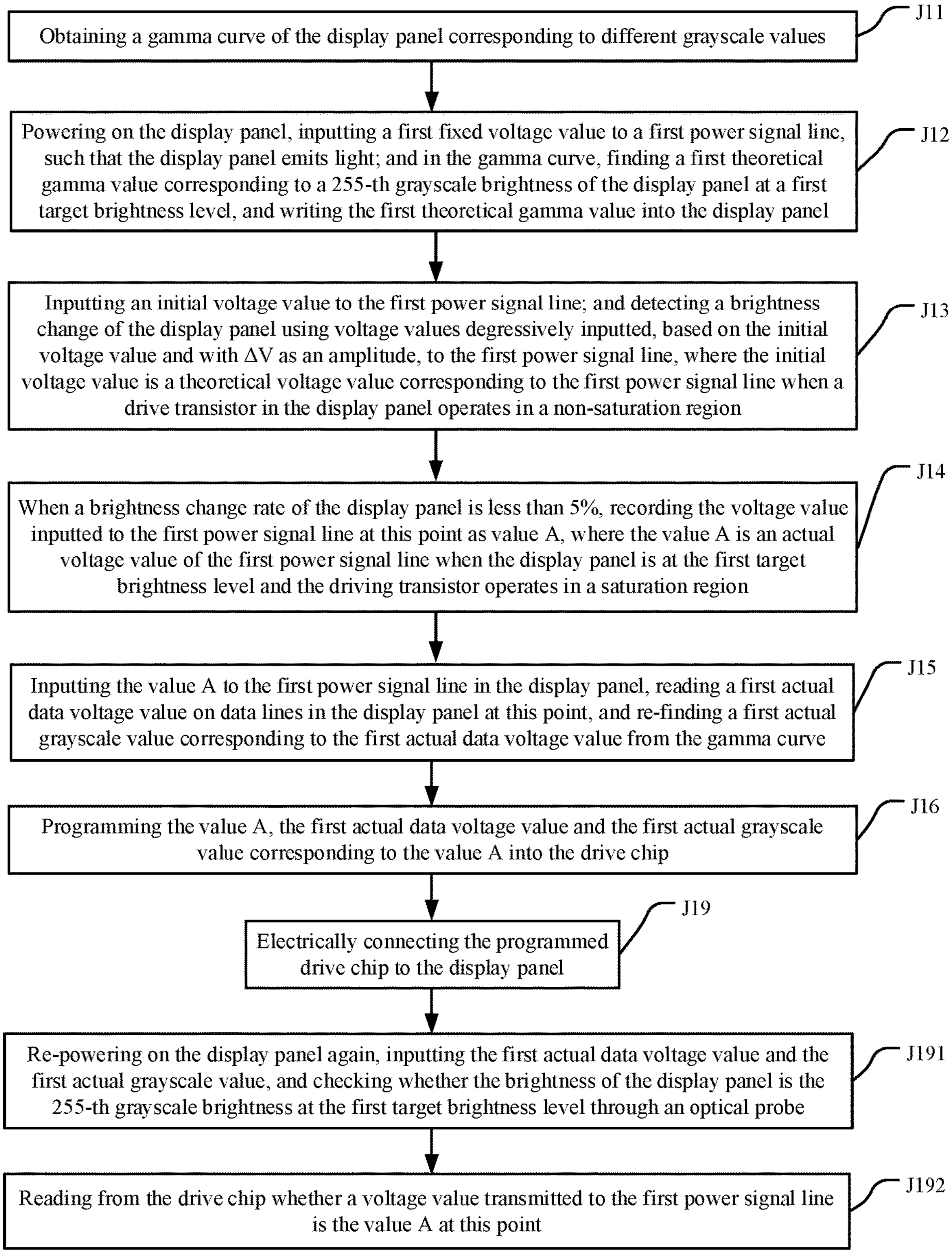
FIG. 13 illustrates another flowchart of an adjustment method according to various embodiments of the present disclosure.

In some optional embodiments, referring to FIGS. 1 and 13, FIG. 13 illustrates another flowchart of an adjustment method according to various embodiments of the present disclosure. The adjustment method of the display apparatus 000 in one embodiment may also include a checking process. The checking process may include following exemplary steps.

At J19, the programmed drive chip 20 may be electrically connected to the display panel 10.

At 191, the display panel 10 may be powered on again, the first actual data voltage value and the first actual grayscale value may be inputted, and whether the brightness of the display panel 10 is the 255-th grayscale brightness at the first target brightness level may be checked through the optical probe.

At J192, whether the voltage value transmitted to the first power signal line 102 is the value A may be read from the drive chip 20 at this point.

In one embodiment, it describes that the adjustment method of the display apparatus may also include the checking process including following exemplary steps. The value A obtained through adjustment, and the first actual data voltage value and the first actual grayscale value corresponding to the value A may be programmed into the drive chip 20. Or, optionally, the checking process may further include binding the programmed drive chip 20 to the display panel 10 after programming the actual values of the first power signal and corresponding actual gamma values at other target brightness levels into the drive chip 20 in the binding region BA, which may realize that the drive chip 20 is electrically connected to the display panel 10. The display panel 10 may be powered on again; then the first actual data voltage value and the first actual grayscale value may be inputted to the display panel 10 through the drive chip 20; and the optical probe may be used to check whether the brightness of the display panel 10 is the 255-th grayscale brightness at the first target brightness level. At this point, whether the voltage value transmitted to the first power signal line 102 is the value A may also be read from the drive chip 20. Or the third actual data voltage value and the third actual grayscale value may be inputted to the display panel 10 through the drive chip 20; and the optical probe may be used to check whether the brightness of the display panel 10 is the 255-th grayscale brightness at the second target brightness level. At this point, whether the voltage value transmitted to the first power signal line 102 is the value B may also be read from the drive chip 20. If the check result is not the 255-th grayscale brightness and the value A at the first target brightness level mentioned above, it may indicate that there is an error in the programming, and corresponding repair is needed. In one embodiment, the adjustment method may further include the checking process, which may check whether the programming of the signal value in the drive chip 20 is correct, thereby being beneficial for better improving accuracy rate.

Figure 14:
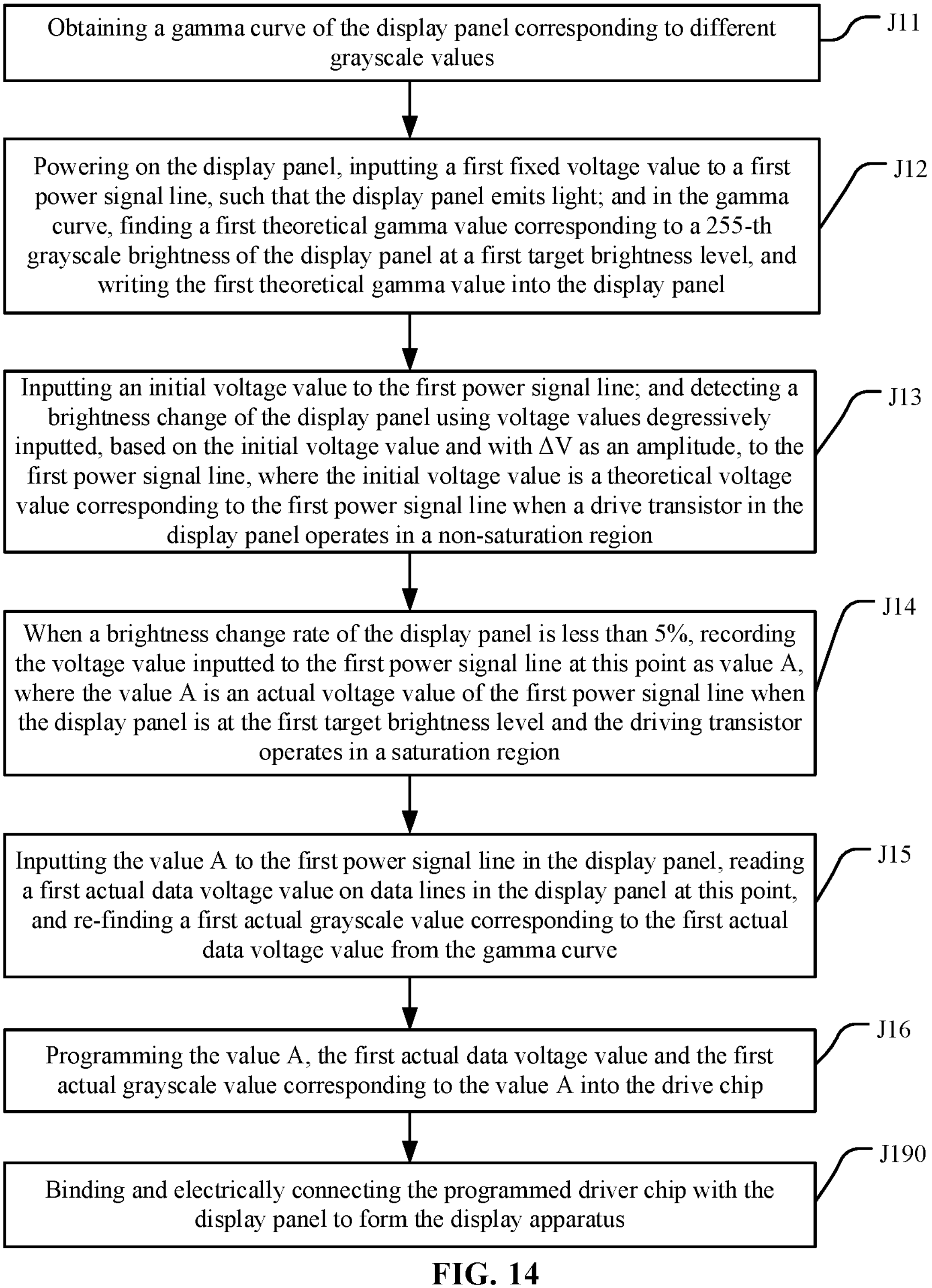
FIG. 14 illustrates a flowchart of a formation method of a display apparatus according to various embodiments of the present disclosure.

In some optional embodiments, referring to FIGS. 1, 4 and 14, FIG. 14 illustrates a flowchart of a formation method of the display apparatus according to various embodiments of the present disclosure. The formation method of the display apparatus 000 provided in one embodiment may include completing the adjustment method in any of above-mentioned embodiments.

At J190, the programmed drive chip 20 may be bound and electrically connected to the display panel 10 to form a display apparatus 000.

For the formation method of the display apparatus 000 provided in one embodiment, it needs to complete the adjustment method in any of above-mentioned embodiments before the drive chip 20 is bound to the display panel 10, such that the drive signal programmed into the drive chip 20 may be obtained and programmed according to performance adjustment of the display panel 10 itself as possible. After the drive signal value obtained through adjustment is programmed into the drive chip 20, other detection processes may also be completed. Finally, after the adjustment and checking process or the like is completed to satisfy the yield rate, the programmed drive chip 20 may be bound and electrically connected to the display panel 10 to form the display apparatus 000 in one embodiment. It may be understood that the display apparatus 000 formed by the formation method in one embodiment may have the beneficial effect of the adjustment method provided by above-mentioned embodiment. For details, reference may be made to specific descriptions of the adjustment methods of the display apparatus in above-mentioned embodiments, which may not be described in detail in one embodiment.

In some optional embodiments, referring to FIGS. 1-4 and 14, the present embodiment provides the display apparatus 000. The display apparatus 000 may include a display apparatus formed according to above-mentioned formation methods. It may be understood that the display apparatus 000 in one embodiment formed by above-mentioned formation methods may be a computer, a television, a vehicle display apparatus and other display apparatuses with display functions, which may not be limited in the present disclosure. The display apparatus 000 provided by embodiments of the present disclosure may have the beneficial effect of the adjustment method provided by above-mentioned embodiments because the adjustment method of above-mentioned embodiments are used in the formation process. For details, reference may be made to specific descriptions of the adjustment methods of the display apparatus in above-mentioned embodiments, which may not be described in detail in one embodiment.

It may be seen from above embodiments that the display apparatus, and the adjustment method and the formation method of the display apparatus provided by the present disclosure may at least achieve the following beneficial effects.

The present disclosure provides the adjustment method for the display apparatus. The display apparatus using the adjustment method may include the display panel and the drive chip. The drive chip may be bound to the display panel after completing the adjustment method, such that the drive chip may be electrically connected to the display panel to form the display apparatus. The display panel may include the plurality of drive transistors and the plurality of first power signal lines. As a part of the pixel circuit, the drive transistor may need to be electrically connected to the first power signal line in the display panel. The first power signal line may be understood as a negative power signal line, which may be configured to provide a negative power signal for the pixel circuit of each sub-pixel. Through above-mentioned adjustment methods of embodiments of the present disclosure, after the drive chip with programmed signal value is bound to the binding region of the display panel subsequently, when the display panel needs to display the 255-th grayscale brightness of the first target brightness level, the voltage value provided by the drive chip to the first power signal line in the display panel may be the value A, and the data voltage signal provided for the data line may be the first actual data voltage value. That is, the drive chip may be used to provide required actual first power signal, instead of the theoretical voltage value that might be less than the value A, for the drive transistor in the display panel in the saturation working region. For the adjustment methods of the display apparatus provided embodiments of the present disclosure, according to the characteristics of each display panel itself, such as performance of the drive transistor operating in the saturation working region, the required value A on the first power signal line corresponding to the 255-th grayscale brightness of the display panel at the first target brightness level and the first actual gamma value corresponding to the value A may be obtained by adjustment, which may provide more accurate adjustment process for the drive signal value subsequently programmed into the drive chip. In such way, the display apparatus bound with the drive chip subsequently may display the 255-th grayscale brightness at the first target brightness level through the actual first power signal value provided by the drive chip, that is, the value A and the first actual gamma value in the display process, which may be beneficial for ensuring overall display effect of the display apparatus 000 while effectively saving power consumption.

Although some embodiments of the present disclosure have been described in detail through various embodiments, those skilled in the art should understand that above embodiments may be for illustration only and may not be intended to limit the scope of the present disclosure. Those skilled in the art should understood that modifications may be made to above embodiments without departing from the scope and spirit of the present disclosure. The scope of the present disclosure may be defined by the appended claims.

What is claimed is:

1. An adjustment method of a display apparatus, wherein the display apparatus includes a display panel and a drive chip; and the display panel at least includes a plurality of drive transistors and a plurality of first power signal lines, the method comprising:

obtaining a gamma curve of the display panel corresponding to different grayscale values;

powering on the display panel, and inputting a first fixed voltage value to a first power signal line, such that the display panel emits light; and in the gamma curve, finding a first theoretical gamma value corresponding to a 255-th grayscale brightness of the display panel at a first target brightness level, and writing the first theoretical gamma value into the display panel;

inputting an initial voltage value to the first power signal line; and detecting a brightness change of the display panel using voltage values degressively inputted, based on the initial voltage value and with ΔV as an amplitude, to the first power signal line, wherein the initial voltage value is a theoretical voltage value corresponding to the first power signal line when a drive transistor in the display panel operates in a non-saturation region;

when a brightness change rate of the display panel is less than 5%, recording the voltage value inputted to the first power signal line at this point as a value A, wherein the value A is an actual voltage value of the first power signal line when the display panel is at the first target brightness level and the drive transistor operates in a saturation region;

inputting the value A to the first power signal line in the display panel, reading a first actual data voltage value on a data line in the display panel at this point, and re-finding a first actual grayscale value corresponding to the first actual data voltage value from the gamma curve; and programming the value A, the first actual data voltage value and the first actual grayscale value corresponding to the value A into the drive chip.

2. The method according to claim 1, wherein:

a first actual gamma value includes the first actual data voltage value and the first actual grayscale value; and the first actual gamma value is a gamma value corresponding to the 255-th grayscale brightness of the display panel at the first target brightness level.

3. The method according to claim 1, wherein:

the first theoretical gamma value includes a first theoretical data voltage value and a first theoretical grayscale value; and in the adjustment method, writing the first theoretical gamma value into the display panel includes writing the first theoretical data voltage value into the data line in the display panel.

4. The method according to claim 3, wherein powering on the display panel, and inputting the first fixed voltage value to the first power signal line, such that the display panel emits light; and in the gamma curve, finding the first theoretical gamma value corresponding to the 255-th grayscale brightness of the display panel at the first target brightness level, and writing the first theoretical gamma value into the display panel includes:

detecting brightness of the display panel through an optical probe, and changing a data voltage value inputted to the data line in the display panel, such that the brightness of the display panel changes;

when the optical probe detects that the brightness of the display panel reaches the 255-th grayscale brightness at the first target brightness level, reading the data voltage value on the data line at this point as the first theoretical data voltage value; and finding the first theoretical grayscale value corresponding to the first theoretical data voltage value from the gamma curve, writing the first theoretical data voltage value and the first theoretical grayscale value into the display panel, and keeping the first theoretical data voltage value and the first theoretical grayscale value to be unchanged.

5. The method according to claim 1, wherein:

$$\Delta V \leq 0.1V.$$

6. The method according to claim 1, wherein:

$$\Delta V = 0.1V.$$

7. The method according to claim 1, wherein detecting the brightness change of the display panel using the voltage values degressively inputted, based on the initial voltage value and with ΔV as the amplitude, to the first power signal line, and recording the voltage value inputted to the first power signal line at this point as the value A when the brightness change rate of the display panel is less than 5% includes:

setting the initial voltage value to be X;

when the voltage value inputted to the first power signal line is adjusted to be X−m×ΔV, detecting, by the optical probe, that the brightness of the display panel is a first brightness;

when the voltage value inputted to the first power signal line is adjusted to X−(m+1)×ΔV, detecting, by the optical probe, that the brightness of the display panel is a second brightness; and if a calculated normalization change rate between the second brightness and the first brightness is less than 5%, taking X−m×ΔV as the value A, wherein m is a positive integer, and ΔV is a positive number.

8. The method according to claim 1, wherein:

the first target brightness level includes a highest target brightness level of the display panel.

9. The method according to claim 1, wherein:

the first target brightness level further includes non-highest target brightness levels; and the adjustment method further includes:

repeating operations of obtaining the gamma curve of the display panel corresponding to different grayscale values; powering on the display panel, and inputting the first fixed voltage value to the first power signal line, such that the display panel emits light; and in the gamma curve, finding the first theoretical gamma value corresponding to another grayscale brightness of the display panel at the first target brightness level, and writing the first theoretical gamma value into the display panel;

inputting the initial voltage value to the first power signal line; and detecting the brightness change of the display panel using the voltage values degressively inputted, based on the initial voltage value and with ΔV as the amplitude, to the first power signal line; when the brightness change rate of the display panel is less than 5%, recording the voltage value inputted to the first power signal line at this point as the value A; inputting the value A to the first power signal line in the display panel, reading the first actual data voltage value on the data line in the display panel at this point, and re-finding the first actual grayscale value corresponding to the first actual data voltage value from the gamma curve; and programming the value A, the first actual data voltage value and the first actual grayscale value corresponding to the value A into the drive chip;

testing another actual voltage value of the first power signal line when the display panel is at the non-highest target brightness level and the drive transistor operates in the saturation region; and obtaining different actual voltage values and different actual gamma values corresponding to the first power signal line at different non-highest target brightness levels one by one and programming the different actual voltage values and the different actual gamma values into the drive chip.

10. The method according to claim 1, wherein:

the value A is the actual voltage value of the first power signal line when the display panel is at a highest target brightness level and the drive transistor operates in the saturation region; and the display panel further includes a plurality of non-highest target brightness levels; and the adjustment method further includes, through calculation and table lookup, obtaining different actual voltage values and different actual gamma values corresponding to the first power signal line at different non-highest target brightness levels, and programming the different actual voltage values and the different actual gamma values into the drive chip.

11. The method according to claim 10, wherein through the calculation and the table lookup, obtaining the different actual voltage values and the different actual gamma values corresponding to the first power signal line at the different non-highest target brightness levels includes:

performing the table lookup to obtain that, when the display panel is at the highest target brightness level and the drive transistor operates in the saturation region, a table lookup value of the first power signal line is a1;

performing the table lookup to obtain that, when the display panel is not at the highest target brightness level and the drive transistor operates in the saturation region, a table lookup value of the first power signal line is b1; and calculating the actual voltage value corresponding to the first power signal line of the display panel at a non-highest target brightness level to be a value P1, wherein $|P1|/|A|=|b1|/|a1|$.

12. The method according to claim 11, further including:

inputting the value P1 to the first power signal line in the display panel, reading a second actual data voltage value on the data line in the display panel at this point, and re-finding a second actual grayscale value corresponding to the second actual data voltage value from the gamma curve; and programming the value P1, the second actual data voltage value and the second actual grayscale value corresponding to the value P1 into the drive chip.

13. The method according to claim 1, wherein:

the value A is the actual voltage value of the first power signal line when the display panel is at a highest target brightness level and the drive transistor operates in the saturation region; and the display panel further includes a plurality of non-highest target brightness levels;

the display panel further includes a plurality of non-highest target brightness levels; the plurality of non-highest target brightness levels includes a second target brightness level and a third target brightness level; and the adjustment method further includes:

repeating operations of obtaining the gamma curve of the display panel corresponding to different grayscale values; powering on the display panel, and inputting the first fixed voltage value to the first power signal line, such that the display panel emits light; and in the gamma curve, finding the first theoretical gamma value corresponding to another grayscale brightness of the display panel at the first target brightness level, and writing the first theoretical gamma value into the display panel;

inputting the initial voltage value to the first power signal line; and detecting the brightness change of the display panel using the voltage values degressively inputted, based on the initial voltage value and with ΔV as the amplitude, to the first power signal line; when the brightness change rate of the display panel is less than 5%, recording the voltage value inputted to the first power signal line at this point as the value A;

testing to obtain that when the display panel is at the second target brightness level and the drive transistor operates in the saturation region, the actual voltage value of the first power signal line is a value B;

inputting the value B to the first power signal line in the display panel, reading a third actual data voltage value on the data line in the display panel at this point, and re-finding a third actual grayscale value corresponding to the third actual data voltage value from the gamma curve; and through calculation and table lookup, obtaining the actual voltage value and the actual gamma value corresponding to the first power signal line at the third target brightness level, and programming the value B, the third actual data voltage value, and the third actual grayscale value into the drive chip.

14. The method according to claim 13, wherein through the calculation and the table lookup, obtaining the actual voltage value and the actual gamma value corresponding to the first power signal line at the third target brightness level includes:

performing the table lookup to obtain that, when the display panel is at the highest target brightness level and the drive transistor operates in the saturation region, a table lookup value of the first power signal line is a2;

performing the table lookup to obtain that, when the display panel is at the second target brightness level and the drive transistor operates in the saturation region, a table lookup value of the first power signal line is b2;

performing the table lookup to obtain that, when the display panel is at the third target brightness level and the drive transistor operates in the saturation region, a table lookup value of the first power signal line is c2; and calculating the actual voltage value corresponding to the first power signal line corresponding to the display panel at the third target brightness level to be a value P2, wherein $$(|c2|-|b2|)/(|a2|-|b2|)=(|P2|-|B|)/(|A|-|B|).$$

15. The method according to claim 1, further including:

a checking process, including:

electrically connecting the programmed drive chip to the display panel;

re-powering on the display panel, inputting the first actual data voltage value and the first actual grayscale value, and checking whether brightness of the display panel is the 255-th grayscale brightness at the first target brightness level through an optical probe; and reading from the drive chip whether a voltage value transmitted to the first power signal line is the value A at this point.

16. The method according to claim 1, wherein:

the initial voltage value is greater than the value A.

17. The method according to claim 1, wherein:

the first power signal line is a negative power signal line.

18. The method according to claim 1, wherein:

the value A is a negative value.

19. A formation method of a display apparatus, comprising:

completing an adjustment method of the display apparatus, wherein the display apparatus includes a display panel and a drive chip; and the display panel at least includes a plurality of drive transistors and a plurality of first power signal lines; and the method comprises:

obtaining a gamma curve of the display panel corresponding to different grayscale values;

powering on the display panel, and inputting a first fixed voltage value to a first power signal line, such that the display panel emits light; and in the gamma curve, finding a first theoretical gamma value corresponding to a 255-th grayscale brightness of the display panel at a first target brightness level, and writing the first theoretical gamma value into the display panel;

inputting an initial voltage value to the first power signal line; and detecting a brightness change of the display panel using voltage values degressively inputted, based on the initial voltage value and with ΔV as an amplitude, to the first power signal line, wherein the initial voltage value is a theoretical voltage value corresponding to the first power signal line when a drive transistor in the display panel operates in a non-saturation region;

when a brightness change rate of the display panel is less than 5%, recording the voltage value inputted to the first power signal line at this point as a value A, wherein the value A is an actual voltage value of the first power signal line when the display panel is at the first target brightness level and the drive transistor operates in a saturation region;

inputting the value A to the first power signal line in the display panel, reading a first actual data voltage value on a data line in the display panel at this point, and re-finding a first actual grayscale value corresponding to the first actual data voltage value from the gamma curve; and programming the value A, the first actual data voltage value and the first actual grayscale value corresponding to the value A into the drive chip; and binding and electrically connecting the programmed driver chip with the display panel to form the display apparatus.

20. A display apparatus, comprising the display apparatus formed according to the formation method of claim 19.

* * * * *